US012608784B1

(12) United States Patent
Luppi

(10) Patent No.: US 12,608,784 B1
(45) Date of Patent: Apr. 21, 2026

(54) AUTOMATIC IMAGE QUALITY PARAMETER TUNING FOR USER-SELECTED VISUAL CHARACTERISTICS BASED ON MACHINE LEARNING

(71) Applicant: Ambarella International LP, Santa Clara, CA (US)

(72) Inventor: Alessandro Luppi, San Giovanni in Persiceto (IT)

(73) Assignee: Ambarella International LP, Santa Clara, CA (US)

( * ) Notice: Subject to any disclaimer, the term of this patent is extended or adjusted under 35 U.S.C. 154(b) by 278 days.

(21) Appl. No.: 18/382,141

(22) Filed: Oct. 20, 2023

(51) Int. Cl.
*G06T 7/00* (2017.01)
*G06V 10/56* (2022.01)
*G06V 10/60* (2022.01)

(52) U.S. Cl.
CPC ............ *G06T 7/0002* (2013.01); *G06V 10/56* (2022.01); *G06V 10/60* (2022.01); *G06T 2207/10024* (2013.01); *G06T 2207/20084* (2013.01); *G06T 2207/30168* (2013.01)

(58) Field of Classification Search
CPC ......... G06T 7/0002; G06T 2207/10024; G06T 2207/20084; G06T 2207/30168; G06V 10/56; G06V 10/60
USPC ....................................................... 382/254
See application file for complete search history.

(56) References Cited

U.S. PATENT DOCUMENTS

| | | | |
|---|---|---|---|
| 2019/0043209 A1* | 2/2019 | Nishimura | H04N 23/60 |
| 2019/0050682 A1* | 2/2019 | Sutic | G06F 18/214 |
| 2020/0234414 A1* | 7/2020 | Zamir | G06T 5/40 |
| 2022/0189029 A1* | 6/2022 | Mequanint | G06T 7/194 |
| 2022/0375067 A1* | 11/2022 | Osunkwo | G06T 7/0004 |
| 2022/0408012 A1* | 12/2022 | Hwang | H04N 23/62 |
| 2023/0014050 A1* | 1/2023 | Khandelwal | G06V 10/44 |
| 2024/0029460 A1* | 1/2024 | Brown | G06V 10/82 |

OTHER PUBLICATIONS

G Pavithra, Bhat Radhesh, "Automatic image quality tuning framework for optimization of ISP parameters based on multi-stage optimization approach" in Proc. IS&T Int'l. Symp. on Electronic Imaging: Image Quality and System Performance XVIII, 2021, pp. 197-1-197-7, https://doi.org/10.2352/ISSN.2470-1173.2021.9.IQSP-197.

* cited by examiner

*Primary Examiner* — Ali Bayat
(74) *Attorney, Agent, or Firm* — Maiorana Patent Law, PA

(57) ABSTRACT

An apparatus includes an interface circuit, a digital signal processing pipeline, and a tuning tool. The interface circuit may be configured to receive pixel data for one or more raw images. The digital signal processing pipeline may be configured to generate processed image data based on the pixel data of the one or more raw images and a set of image quality parameters. The tuning tool may be configured to generate the set of image quality parameters based on the one or more raw images by executing a first artificial neural network model that was trained using a set of the raw images, a set of reference images, and a loss function.

19 Claims, 9 Drawing Sheets

TRAFFIC CAMERAS

VEHICLE CAMERAS

ACCESS CONTROL CAMERAS

ANPR CAMERAS

ATM CAMERAS

DOME CAMERAS

BULLET CAMERAS

VEHICLE CAMERAS

ACCESS CONTROL CAMERAS

TRAFFIC CAMERAS

ATM CAMERAS

BULLET CAMERAS

DOME CAMERAS

ANPR CAMERAS

50

52

54

56

58

60

62

400

402

410

PROCESSOR

412

MEM

414

DISPLAY

416

USER
INTERFACE

406

API

404

300

PROG

AUTOMATIC IMAGE QUALITY PARAMETER TUNING FOR USER-SELECTED VISUAL CHARACTERISTICS BASED ON MACHINE LEARNING

FIELD OF THE INVENTION

The invention relates to digital image processing generally and, more particularly, to a method and/or apparatus for implementing automatic image quality parameter tuning for user-selected visual characteristics based on machine learning.

BACKGROUND

When a digital image sensor measures light at individual locations or picture elements (pixels), the measurements are not exact but rather include noise. Picture noise can degrade the subjective quality of a digital picture. Typically, digital image capture devices (e.g., cameras) incorporate some form of image signal processing (ISP) to reduce picture noise based on numerous image quality (IQ) parameters.

Initiating a project involving tuning the IQ parameters of an ISP pipeline can be quite complicated and time consuming. Manually tuning the IQ parameters can take several weeks to months due to the large number of IQ parameters of the ISP pipeline to be optimized and the number of iterations needed to obtain good image quality. Moreover, switching from a system-on-chip (SoC) and camera module to another setup may require a complete re-tuning of the IQ parameters configuring the ISP pipeline, leading to an increase in development work.

For different applications, engineers may need different ISP settings according to specific needs. Therefore, it would be helpful to have a flexible tuning system that allows engineers to choose the characteristics of the resulting image output from the ISP pipeline.

It would be desirable to implement automatic image quality parameter tuning for user-selected visual characteristics based on machine learning.

SUMMARY

The invention concerns an apparatus comprising an interface circuit, a digital signal processing pipeline, and a tuning tool. The interface circuit may be configured to receive pixel data for one or more raw images. The digital signal processing pipeline may be configured to generate processed image data based on the pixel data of the one or more raw images and a set of image quality parameters. The tuning tool may be configured to generate the set of image quality parameters based on the one or more raw images by executing a first artificial neural network model that was trained using a set of the raw images, a set of reference images, and a loss function.

BRIEF DESCRIPTION OF THE FIGURES

Embodiments of the invention will be apparent from the following detailed description and the appended claims and drawings.

DETAILED DESCRIPTION OF THE EMBODIMENTS

Figure 1:
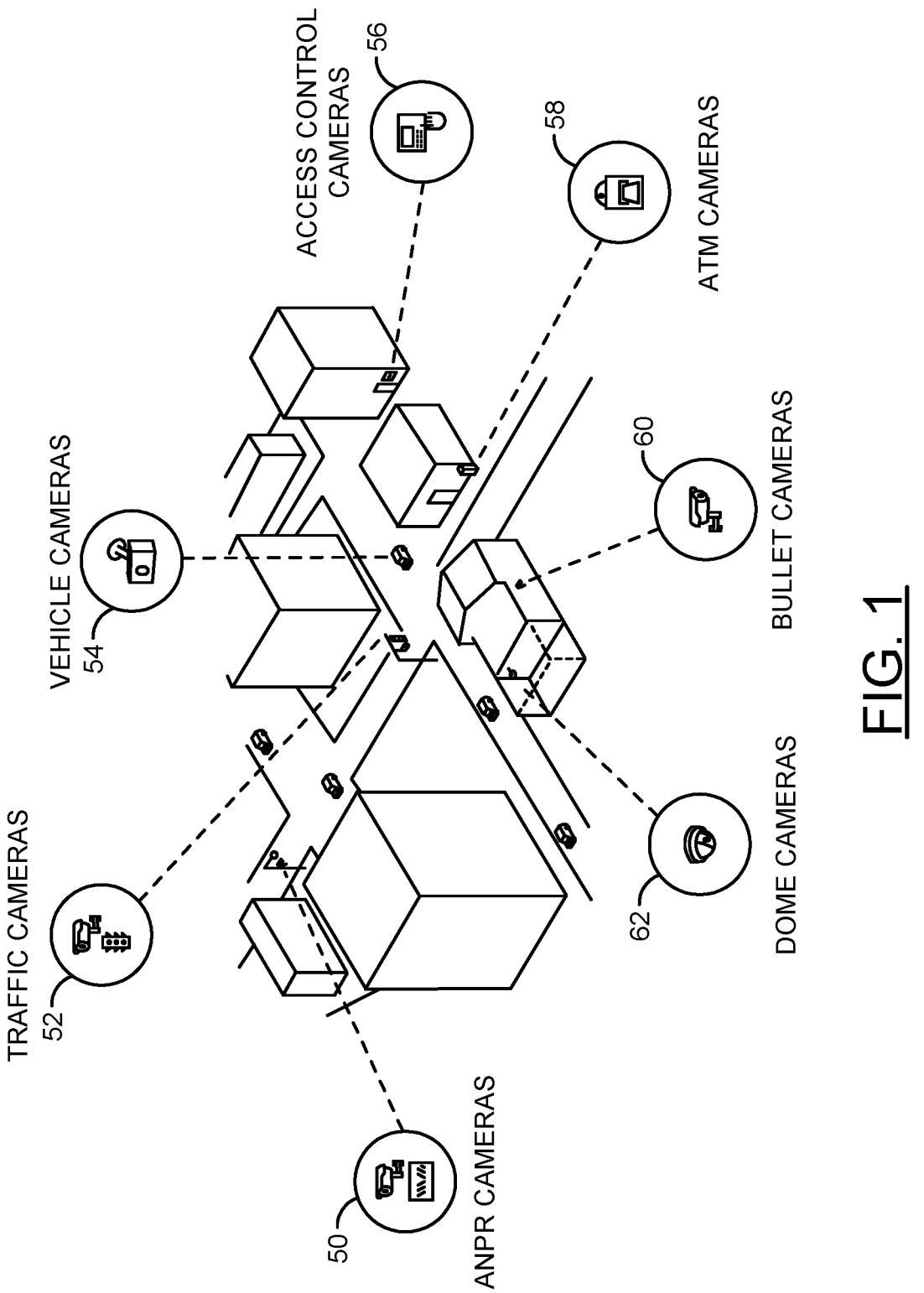
FIG. 1 is a diagram illustrating example of edge devices that may utilize image quality parameter tuning in accordance with an embodiment of the invention.

Embodiments of the present invention include providing automatic image quality parameter tuning for user-selected visual characteristics based on machine learning that may (i) provide a modern machine learning based (ML-based) image quality parameter tuning tool, (ii) implement a combination of automatic image quality (IQ) tuning with a modern ML-based architecture, (iii) integrate the ML-based tuning tool model with a hardware (HW) implementation (or equivalent software (SW) emulation) of an image digital signal processing (IDSP) pipeline model during a training phase of the model, (iv) insert the actual IDSP pipeline (or equivalent software (SW) emulation) in a feedback loop that trains the ML-based tuning tool model, (v) apply IQ parameters generated by the ML-based tuning tool, via the IDSP pipeline, on raw images to evaluate, via a second ML-based model, whether desired visual characteristics are present on resulting images, (vi) be performed "offline", thus not consuming any runtime resources, (vii) provide a set of customized IQ tuning parameters to exploit an IDSP pipeline on a selected SoC, (viii) be run on a host computer before implementation on the SoC, (ix) allow a user to choose preferred visual characteristics of the images resulting from the IDSP pipeline, (x) be flexible enough to adapt to any characteristics a user may possibly want, even if the characteristics are not ones typically desired for computer vision applications, (xi) understand, without knowing beforehand what characteristics should be found in the output image, whether the output image contains a specific visual characteristic or not, (xii) provide an IQ parameter tuning tool that may be directly integrated with SoC systems, (xiii) provide an IQ parameter tuning tool that may be configured to generate either generic IQ parameters (e.g., a user has to translate them to SoC-specific parameters) or specific IQ parameters (e.g., ready to be integrated in a specific SoC), (xiv) provide IQ parameters that may be easily integrated with proprietary systems, (xv) provide IQ parameters that may be difficult to integrate with systems of competitors, to voluntarily limit usage, and/or (xvi) be implemented as one or more integrated circuits.

Artificial intelligence (AI) solutions that rely on computer vision need to begin with high-quality video. This is especially true for AI system applications on the road (e.g., ADAS, DMS, autonomous vehicle control, etc.). When a vision-based system uses grainy, low-quality images of traffic and pedestrians, any decisions recommended are suspect and any warnings provided are less reliable. Vision-based surveillance and security systems may be similarly affected when using grainy, low-quality images. However, when the same systems start with high-quality imagery, accuracy is improved significantly. High-quality imagery, for example, enables AI systems to more successfully identify objects in the environment, evaluate complex scenarios, and make predictions as situations change.

Although computer vision applications do not "see" images in the same way humans do, this does not diminish the importance of high-quality image processing techniques. If anything, high-quality image processing techniques become even more important, especially when lives are at stake (e.g., on the road). An image digital signal processing (IDSP) pipeline is generally used to obtain high-quality imagery. The IDSP pipeline generally utilizes a combination of complex processes to transform raw sensor data into pristine imagery. In an example, high dynamic range (HDR) processing allows an advanced driver assistance system (ADAS) to operate successfully in scenarios where a high degree of contrast creates perception challenges, such as when a vehicle emerges from a tunnel. Related techniques may also be applied to help the same ADAS system perform well in low-light environments, rain, snow, or fog.

A number of different image quality (IQ) parameters (e.g., HDR, color, tone mapping, edge detection, sharpness filters, etc.) of the IDSP pipeline may be tuned differently for artificial intelligence application (e.g., sensing applications) or for human consumption (e.g., viewing applications). Manually tuning the myriad IQ parameters of an ISP pipeline can be quite complicated and time consuming. Moreover, switching from a system-on-chip (SoC) and camera module to another setup may involve a complete re-tuning of the IQ parameters configuring the IDSP pipeline, leading to an increase in development costs. For different applications, engineers may need different ISP settings to meet specific needs.

In various embodiments, an image quality parameter tuning tool is generally provided that enables rapid tuning of an IDSP pipeline to provide the flexibility needed for consumption by both artificial intelligence applications and humans. In various embodiments, an image quality parameter tuning tool may be provided, based on a machine learning technique (or process), that prepares the image quality parameter tuning tool "offline", thus not consuming runtime resources. In an example, the image quality parameter tuning tool in accordance with an embodiment of the invention may be used to prepare a set of IQ tuning parameters to exploit an IDSP pipeline on a selected SoC. In an example, the image quality parameter tuning tool may be run on a host computer before actual implementation on the selected SoC. In an example, a user may be allowed to choose preferred visual characteristics of the images resulting from the IDSP pipeline. In an example, the image quality parameter tuning tool in accordance with an embodiment of the invention may be flexible enough to adapt to any characteristics a user may possibly want, even if the characteristics are not ones typically desired for computer vision applications. In an example, the image quality parameter tuning tool in accordance with an embodiment of the invention may be configured to automatically extract the visual characteristics a user may want from a set of reference images embodying the visual characteristics, regardless of whether the reference images are ideal.

In an example, the image quality parameter tuning tool does not need to know beforehand what characteristics should be found in the output image. Instead, the image quality parameter tuning tool may understand (e.g., via a set of reference images) whether the output image contains a specific visual characteristic or not. In an example, a developer may utilize the image quality parameter tuning tool in accordance with an embodiment of the invention to develop a new SoC/camera pair and, in a few minutes after some specific inputs are supplied, obtain a set of IQ parameters that allow the IDSP pipeline to produce images with the desired visual characteristics. In some embodiments, the user may also be allowed to manually fine tune some of the parameters after a generic tuning that provides a starting point.

Referring to FIG. 1, a diagram is shown illustrating examples of edge devices that may utilize image quality parameter tuning in accordance with an embodiment of the invention. In an example, edge devices may include low power technology designed to be deployed in embedded platforms at the edge (e.g., battery-powered devices), where power consumption is a critical concern. In an example, edge devices may comprise traffic cameras and intelligent transportation systems (ITS) solutions including automated number plate recognition (ANPR) cameras 50, traffic cameras 52, vehicle cameras 54, access control cameras 56, automatic teller machine (ATM) cameras 58, bullet cameras 60, and dome cameras 62. In an example, the traffic cameras and intelligent transportation systems (ITS) solutions may be designed to enhance roadway security with a combination of person and vehicle detection, vehicle make/model recognition, and automatic number plate recognition (ANPR) capabilities. In an example, edge devices may further comprise smart phones and smart home internet-of-things (IoT) devices.

In an example, person and vehicle detection, vehicle make/model recognition, and automatic number plate recognition (ANPR) capabilities may be facilitated utilizing image quality parameter tuning in accordance with embodiments of the invention. In an example, access control cameras may comprise security camera applications. In an example, the security camera applications may include battery-powered cameras, doorbell cameras, outdoor cameras, and indoor cameras. In an example, the security camera application edge devices may include low power technology designed to be deployed in embedded platforms at the edge (e.g., battery-powered devices), where power consumption is a critical concern. The security camera applications may realize performance benefits from application of image quality parameter tuning in accordance with embodiments of the invention.

In various embodiments, an image quality parameter tuning tool may be implemented. The image quality parameter tuning tool is generally trained using a dataset provided by an end user. The image quality parameter tuning tool is generally trained to adapt to an image quality loss of an edge device on which the image quality parameter tuning tool will be utilized in conjunction with an image digital signal processing (IDSP) pipeline (also referred to more simply as an image signal processing (ISP) pipeline or a digital signal processing (DSP) pipeline). Training the image quality parameter tuning tool generally involves less effort than redesigning the IDSP pipeline.

Figure 2:
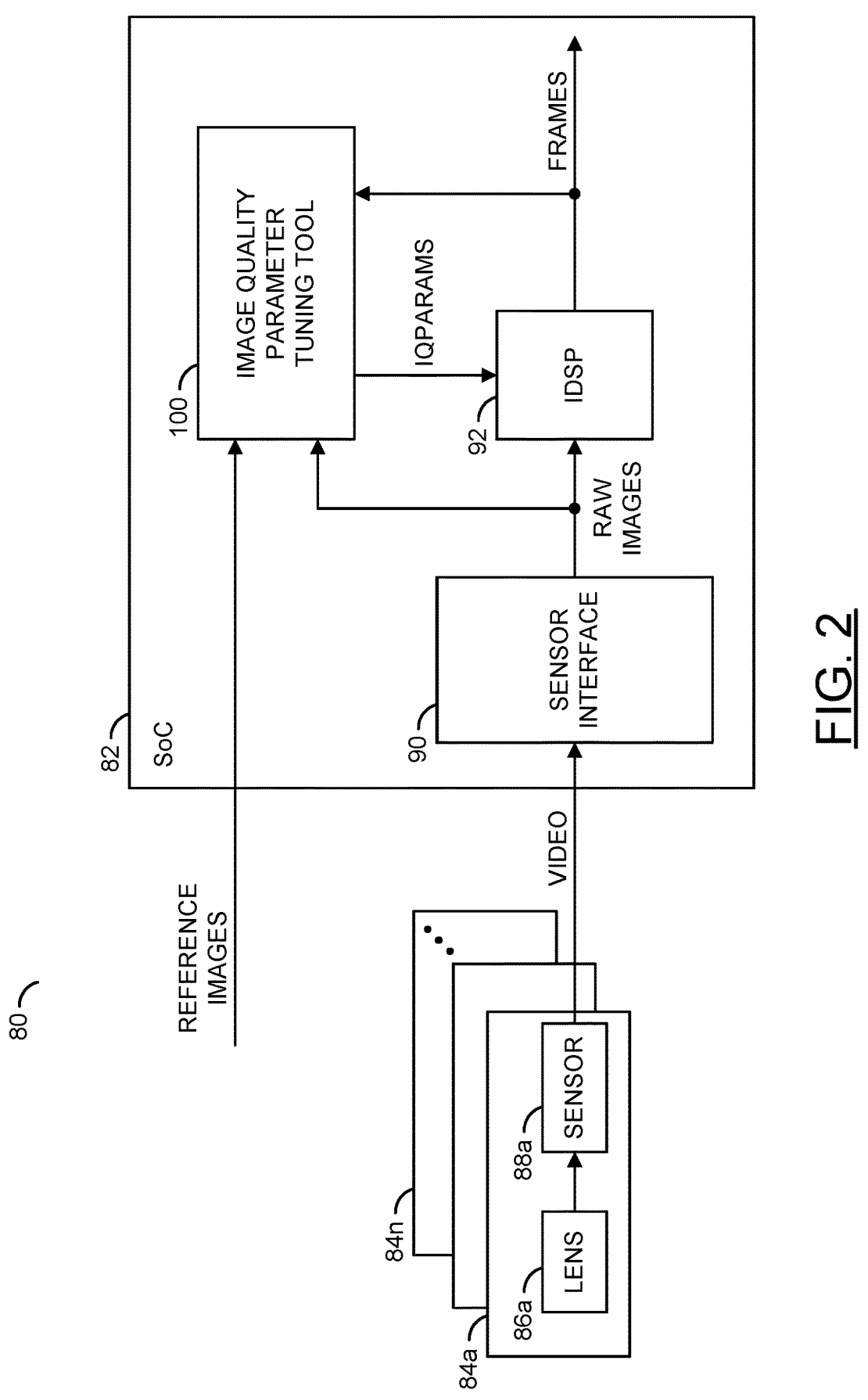
FIG. 2 is a diagram illustrating a camera system implementing image quality parameter tuning in accordance with an embodiment of the invention.

Referring to FIG. 2, a diagram is shown illustrating a camera system implementing image quality parameter tuning in accordance with an embodiment of the invention. In an example, a camera system 80 may be configured to implement an image quality parameter tuning process and/or tool in accordance with an embodiment of the invention. In an example, the camera system 80 may be implemented in an edge device. In an example, the camera system 80 may comprise a block (or circuit) 82, and one or more blocks (or circuits) 84a-84n. In an example, the block 82 may be implemented as a processor or system-on-chip (processor/SoC). In an example, the blocks 84a-84n may each implement a camera assembly.

In an example, the camera assemblies 84a-84n may comprise lenses 86a-86n and blocks (or circuits) 88a-88n. In an example, the circuits 88a-88n may comprise capture devices. The lenses 86a-86n may be attached to the capture devices 88a-88n. The capture devices 88a-88n may be configured to receive light as an input via the lenses 86a-86n. The lenses 86a-86n may be implemented as optical lenses. The lenses 86a-86n may provide a zooming feature and/or a focusing feature. The capture devices 88a-88n and/or the lenses 86a-86n may be implemented, in one example, as a single assembly. In another example, the lenses 86a-86n may be a separate implementation from the capture devices 88a-88n.

The capture devices 88a-88n may be configured to convert the input light into computer readable data. The capture devices 88a-88n may capture data received through the lenses 86a-86n to generate raw pixel data. In some embodiments, the capture devices 88a-88n may capture data received through the lenses 86a-86n to generate bitstreams (e.g., generate video frames). For example, the capture devices 88a-88n may receive focused light from the lenses 86a-86n. The lenses 86a-86n may be directed, tilted, panned, zoomed and/or rotated to provide a targeted view from the camera system 80. The capture device 84a may generate a signal (e.g., VIDEO). The signal VIDEO may be pixel data (e.g., a sequence of pixels that may be used to generate video frames). In some embodiments, the signal VIDEO may be video data (e.g., a sequence of video frames). The signal VIDEO may be presented to one of the inputs of the processor/SoC 82. In some embodiments, the pixel data generated by the capture device 84a may be uncompressed and/or raw data generated in response to the focused light from the lens 86a. In some embodiments, the output of the capture devices 88a-88n may be digital video signals.

The lenses 86a-86n (e.g., camera lenses) may be directed to provide a view of an environment surrounding the apparatus 80. The lenses 86a-86n may be aimed to capture environmental data. The lenses 86a-86n may be a wide-angle lens and/or fish-eye lens (e.g., lenses capable of capturing a wide field of view). The lenses 86a-86n may be configured to capture and/or focus the light for the capture devices 88a-88n. Generally, the capture devices 88a-88n are located behind the lenses 86a-86n. Based on the captured light from the lenses 86a-86n, the capture devices 88a-88n may generate a bitstream and/or video data (e.g., the signal VIDEO).

In various embodiments, the lenses 86a-86n may be implemented as fixed focus lenses. A fixed focus lens generally facilitates smaller size and low power. In an example, a fixed focus lens may be used in battery powered, doorbell, and other low power camera applications. In some embodiments, the lenses 86a-86n may be directed, tilted, panned, zoomed and/or rotated to capture the environment surrounding the apparatus 80 (e.g., capture data from the field of view). In an example, professional camera models may be implemented with an active lens system for enhanced functionality, remote control, etc.

The capture devices 88a-88n may transform the received light into a digital data stream. In some embodiments, the capture devices 88a-88n may perform an analog to digital conversion. For example, the capture devices 88a-88n may perform a photoelectric conversion of the light received by the lenses 86a-86n. The capture devices 88a-88n may transform the digital data stream into a video data stream (or bitstream), a video file, and/or a number of video frames. In an example, the capture devices 88a-88n may present the video data as a digital video signal (e.g., VIDEO). The digital video signal may comprise the video frames (e.g., sequential digital images and/or audio). In some embodiments, the camera assemblies 84a-84n may comprise a microphone for capturing audio.

The video data captured by the capture devices 88a-88n may be represented as a signal/bitstream/data VIDEO (e.g., a digital video signal). The capture devices 88a-88n may present the signal VIDEO to the processor/SoC 82. The signal VIDEO may represent the video frames/video data. The signal VIDEO may be a video stream captured by the capture devices 88a-88n. In some embodiments, the signal VIDEO may comprise pixel data that may be operated on by the processor/SoC 82 (e.g., using an image digital signal processor (IDSP), etc.). The processor/SoC 82 may generate video frames in response to the pixel data in the signal VIDEO.

In various embodiments, the capture devices 88a-88n may be configured to generate an RGB video signal, an IR video signal, and/or an RGB-IR video signal. In an infrared light only illuminated field of view, the capture devices 88a-88n may generate a monochrome (B/W) video signal. In a field of view illuminated by both IR light and visible light, the capture devices 88a-88n may be configured to generate color information in addition to the monochrome video signal. In various embodiments, the capture devices 88a-88n may be configured to generate a video signal in response to visible and/or infrared (IR) light. In an example, the circuits 88a-88n may comprise a color (RGB) image sensor, an infrared (IR) image sensor and/or a hybrid RGB-IR image sensor.

In some embodiments, the capture devices 88a-88n may comprise a rolling shutter sensor or a global shutter sensor. In an example, the rolling shutter sensor may implement an RGB-IR sensor. In some embodiments, the capture devices 88a-88n may comprise a rolling shutter IR sensor and an RGB sensor (e.g., implemented as separate components). In an example, the rolling shutter sensor may be implemented as an RGB-IR rolling shutter complementary metal oxide semiconductor (CMOS) image sensor. In one example, the rolling shutter sensor may be configured to assert a signal that indicates a first line exposure time. In one example, the rolling shutter sensor may apply a mask to a monochrome sensor. In an example, the mask may comprise a plurality of units containing one red pixel, one green pixel, one blue pixel, and one IR pixel. The IR pixel may contain red, green, and blue filter materials that effectively absorb all of the light in the visible spectrum, while allowing the longer infrared wavelengths to pass through with minimal loss. With a rolling shutter, as each line (or row) of the sensor starts exposure, all pixels in the line (or row) may start exposure simultaneously.

In an example, the circuit 82 may comprise a block (or circuit) 90, a block (or circuit) 92, and a block (or circuit) 100. The circuit 90 may implement a sensor interface. The circuit 92 may implement an image digital signal processing (IDSP) pipeline. The circuit 100 may implement an image quality parameter tuning tool in accordance with an embodiment of the invention. The circuit 90 may be configured to receive data communicated by the camera systems 84a-84n. In an example, the image data signal VIDEO may be presented to an input of the circuit 90. The circuit 90 may generate video frames in response to the pixel data in the signal VIDEO. The video frames generated by the circuit 90 may comprise raw images formed by the raw pixel data received by the circuit 90 via the signal VIDEO. The circuit 90 may have an output that may present a signal (e.g., RAW IMAGES) that may communicate the raw image data. The signal RAW IMAGES may be presented to a first input of the circuit 92 and a first input of the circuit 100.

The circuit 92 generally implements an image digital signal processor (IDSP) pipeline of the processor/SoC 82. The circuit 92 is generally used to obtain high-quality imagery. In an example, the circuit 92 generally utilizes a combination of complex processes (e.g., described below in connection with FIG. 4) to transform the raw image data received in the signal RAW IMAGES into pristine imagery. A set of image quality (IQ) parameters is used by the circuit 92 to allow the IDSP pipeline to produce images with desired visual characteristics. The circuit 92 may have a second input that may receive a signal (e.g., IQPARAMS) that may communicate the set of image quality parameters. The image quality parameters communicated by the signal IQPARAMS may be utilized by the circuit 92 to process the raw image data received via the signal RAW IMAGES. In an example, the signal IQPARAMS may comprise image quality parameters related to one or more of black level correction, lens distortion correction, lens shading correction, sensor defect detection, spatial and temporal noise reduction, Bayer demosaicing, color and tone correction, brightness and saturation, contrast, sharpness, white balance, autofocus statistics, auto-exposure statistics, automatic white balance statistics, color space conversion, gamma correction, dynamic range, electronic image stabilization, decompanding, anti-aliasing, chromatic aberration, digital gain, vignette compensation, and statistics extraction. The circuit 92 may have an output that may present a signal (e.g., FRAMES) that may communicate processed image data. The circuit 92 is generally configured to generate the processed image data presented in the signal FRAMES in response to the raw image data receive via the signal RAW IMAGES and IQ parameters received via the signal IQPARAMS.

The circuit 100 generally implements an image quality parameter tuning tool in accordance with an embodiment of the invention. In various embodiments, the circuit 100 may be configured to generate a set of IQ parameters which, when applied on raw images via the IDSP pipeline of the circuit 92, allows the circuit 92 to obtain new images with desired visual characteristics. In some embodiments, the IQ parameters provided by the image quality parameter tuning tool 100 may be customized to produce IQ tuning that can only be used with proprietary systems, voluntarily limiting the use of the image quality parameter tuning tool in combination with competing tools and systems. In an example, the image quality parameter tuning tool may include a post-processing embedded block that translates generic IQ parameters to SoC-specific values.

In an example, the circuit 100 may have a first input that may receive a set of raw images from the selected SoC/camera couple, a second input that may receive one or more reference images (e.g., via a signal REFERENCE IMAGES) embedding the desired visual characteristics, and an output that may communicate either the generic or the customized IQ parameters via the signal IQPARAMS. In an example, the signal REFERENCE IMAGES may communicate one or more reference images that exemplify an image quality to be obtained. In various embodiments, the circuit 100 implements a first machine learning based (ML-based) model that, in an operating mode, generates (tunes) the set of IQ parameters communicated via the signal IQPARAMS based on the set of raw images received at the first input and the one or more reference images received at the second input.

The circuit 100 may also implement a training mode in which a second ML-based model may be used to train the first ML-based model. In the training mode, a training process may utilize the second ML-based model cascaded with a hardware (HW) implementation (or equivalent software (SW) emulation) of an image digital signal processing (IDSP) pipeline model. In some embodiments, the training process may utilize the IDSP pipeline of the circuit 92 during the training mode. In embodiments utilizing the circuit 92, the circuit 100 may have a third input that may receive the processed image data from the circuit 92 via the signal FRAMES.

In the training mode, the training process may utilize the second ML-based model to generate a signal (e.g., LOSS) based on the set of raw images, the one or more reference images, and a loss function. The signal LOSS generally communicates a result (or loss) of the loss function. The second ML-based model is generally configured (trained) to evaluate the results coming from the first ML-based model and generate the signal LOSS based on comparison of the results coming from the first ML-based model with the one or more reference images received at the second input, and allows an iterative training of the first ML-based model according to the signal loss.

In various embodiments, the image quality parameter tuning tool 100 may be trained in a semi-supervised fashion, since the model needs to learn an embedded representation of the visual characteristics with some feedbacks that may be provided by human expertise. In an example, rather than performing model training on request, a continuous improvement approach may be followed that performs model training whenever new images, labels, historical results, etc., become available. In an example, the first ML-based model may be built and trained such that only one image per scenario of interest may be needed (e.g., for automotive application: one image shot on the road during the day, one shot in a garage during the night, etc.). In an example, the second ML-based model may be built and trained such that only one image for each extreme condition of interest may be needed (e.g., one image shot during the day, one during the night, one with a source of light directly in front of the camera, etc.). In general, the set of reference images is not the output goal of the ML-based model. Rather, the set of reference images generally provides the desired visual characteristics that the ML-based model needs to learn to replicate on the set of raw images. As such, the set of reference images may be obtained from an already tuned camera module, or even downloaded from a dataset on the internet.

Figure 3:
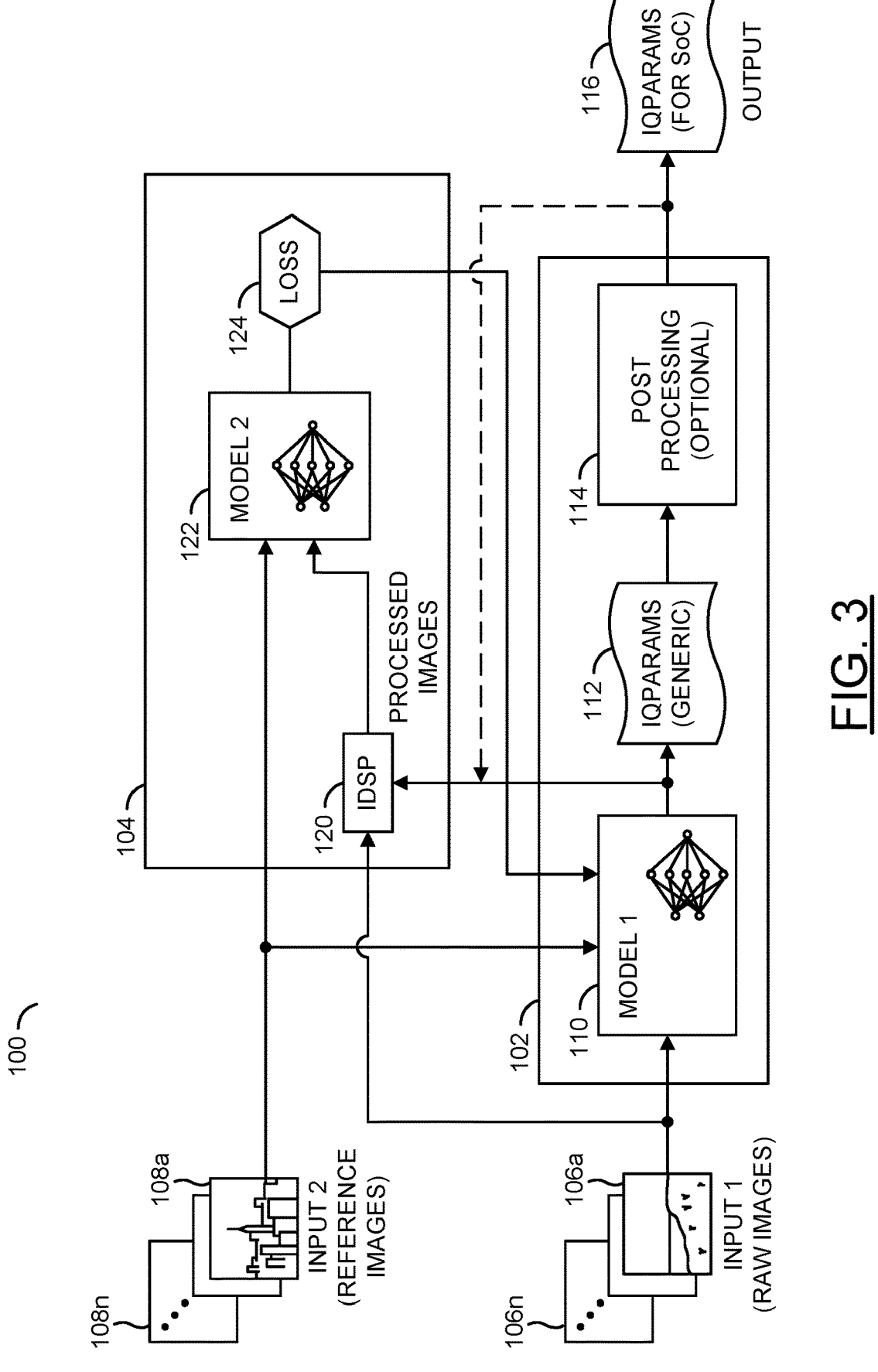
FIG. 3 is a diagram illustrating an example implementation of an image quality parameter tuning circuit in accordance with an embodiment of the invention.

Referring to FIG. 3, a diagram is shown illustrating an example implementation of an image quality parameter tuning tool circuit in accordance with an embodiment of the invention. In an example, the circuit 100 may comprise a block (or circuit) 102 and a block (or circuit) 104. The circuit 102 may have a first input that may receive the signal RAW IMAGES, a second input that may receive the signal REFERENCE IMAGES, a third input that may receive the loss signal (e.g., LOSS), and an output that may present the signal IQPARAMS. The signal IQPARAMS generally comprise image quality parameter values generated by the circuit 102 based on the signal RAW IMAGES, the signal REFERENCE IMAGES, and the loss signal LOSS. In some embodiments, the signal IQPARAMS may comprise generic image quality parameter values. In some embodiments, the circuit 102 may implement a post processing customization step. In embodiments implementing the post processing customization step, the signal IQPARAMS may comprise customized (e.g., SoC-specific, proprietary, etc.) image quality parameter values.

The circuit 104 may have a first input that may receive the signal RAW IMAGES, a second input that may receive the signal REFERENCE IMAGES, a third input that may receive the signal IQPARAMS, and an output that may present the loss signal LOSS. The circuit 104 is generally configured to generate the loss signal LOSS in response to the signal RAW IMAGES, the signal REFERENCE IMAGES, the signal IQPARAMS, and a loss function. In an example, the circuit 104 may operate similarly to a "discriminator" or a "critique" element of a generative adversarial network (GAN), in that the circuit 104 generally rates the result of applying the image quality parameter values in the signal IQPARAMS on the raw images in the signal RAW IMAGES against the reference images in the signal REFERENCE IMAGES. In an example, the loss function may comprise a min-max loss as used in training GAN networks. In some embodiments, the loss function may start with the min-max loss and move to a different loss function (e.g., non-saturating GAN loss, Wasserstein Generative Adversarial Network (WGAN) loss, etc.).

In an example, the signal RAW IMAGES may communicate a set of raw images 106a-106n. In an example, the set of raw images 106a-106n may be obtained from a selected SoC/camera pair. In an example, when the circuit 102 is ideally configured (built and trained), only one image per scenario of interest may be needed (e.g., for automotive application: one image shot on the road during the day, one shot in a garage during the night, etc.). In an example, the signal REFERENCE IMAGES may communicate one or more reference images 108a-108n embedding the desired visual characteristics. In an example, when the circuits 102 and 104 are ideally configured (built and trained), only one image for each extreme condition of interest may be needed (e.g., one image shot during the day, one during the night, one with a source of light directly in front of the camera, etc.). In general, the set of reference images 108a-108n communicated by the signal REFERENCE IMAGES does not provide the output goal of the circuit 102. Rather, the set of reference images 108a-108n communicated by the signal REFERENCE IMAGES provides the desired visual characteristics that the circuit 102 needs to learn (e.g., via a machine learning technique or process) to replicate on the set of raw images 106a-106n communicated via the signal RAW IMAGES. In an example, the set of reference images 108a-108n communicated by the signal REFERENCE IMAGES may be obtained from an already tuned camera module, downloaded from a dataset on internet, or obtained from some other source selected by a user.

In various embodiments, the signal IQPARAMS communicates a set of IQ parameters which, if applied on the raw image date communicated by the signal RAW IMAGES via the IDSP pipeline 92, allows the IDSP pipeline 92 to obtain new images (e.g., processed images) with the desired visual characteristics. In embodiments implementing the post-processing step, the output e.g., the signal IQPARAMS) provided by the image quality parameter tuning tool 100 may be customized to produce IQ tuning that may only be used with proprietary systems, voluntarily limiting the use of the image quality parameter tuning tool 100 in combination with competing tools and systems. To achieve this goal, the image quality parameter tuning tool 100 may include a post-processing embedded block that translates the generic IQ parameters to some SoC-specific values.

In various embodiments, the circuit 102 may comprise a block (or circuit) 110. The circuit 110 may implement a first artificial neural network model (e.g., MODEL 1). In an example, the first artificial neural network model MODEL 1 may be implemented as a convolutional neural network (CNN) model. The circuit 110 may have a first input that may receive the signal RAW IMAGES, a second input that may receive the signal REFERENCE IMAGES, a third input that may receive the loss signal LOSS, and an output that may present the signal IQPARAMS comprising a set of generic image quality parameters 112. The first artificial neural network model MODEL 1 may be configured (trained) to generate the set of generic image quality parameters 112 based on the raw image data communicated via the signal RAW IMAGES, the image data embedding the desired visual characteristics communicated via the signal REFERENCE IMAGES, and the loss signal LOSS.

In some embodiments, the circuit 102 may further comprise a block (or circuit) 114. The circuit 114 may implement an optional post-processing circuit. The circuit 114 may have an input that may receive the set of generic image quality parameters 112 and an output that may present a set of customized (e.g., SoC-specific, proprietary, etc.) image quality parameters 116. The post-processing circuit 114 is generally configured to generate the set of customized image quality parameters 116 from the set of generic image quality parameters 112. In an example, the post-processing circuit 114 may be configured to translate the set of generic IQ parameters 112 to some device-specific values. In an example, the set of customized image quality parameters 116 may be customized for a particular device (e.g., a system-on-chip, edge device, proprietary device, etc.).

In an example, the circuit 104 may comprise a block (or circuit) 120 and a block (or circuit) 122. The circuit 120 may implement a model of an image digital signal processing (IDSP) pipeline. In some embodiments, the circuit 120 may implement the model of the IDSP pipeline with a hardware (HW) implementation (or an equivalent software (SW) emulation) of an image digital signal processing (IDSP) pipeline model. In some embodiments, the circuit 120 may comprise the actual IDSP pipeline of the circuit 92. The circuit 122 may implement a second artificial neural network model (e.g., MODEL 2). In an example, the second artificial neural network model MODEL 2 may be implemented as a convolutional neural network (CNN) model.

In an example, the circuit 120 may have a first input that may receive the signal RAW IMAGES, a second input that may receive the signal IQPARAMS, and an output that may present a signal (e.g., PROCESSED IMAGES). The signal PROCESSED IMAGES may communicate new, processed image data generated by the circuit 120. In an example, the circuit 120 may be configured to generate the processed image data presented in the signal PROCESSED IMAGES in response to the raw image data receive via the signal RAW IMAGES and IQ parameters received via the signal IQPARAMS.

In an example, the circuit 122 may have a first input that may receive the signal PROCESSED IMAGES from the circuit 120 and a second input that may receive the signal REFERENCE IMAGES. The circuit 122 may have an output that presents the loss signal LOSS. The second artificial neural network model MODEL 2 implemented by the circuit 122 is generally configured (trained) to generate the loss signal LOSS in response to the output of the circuit 120, the signal REFERENCE IMAGES, and the loss function.

Although the actual implementation of the image quality parameter tuning tool 100 may vary during development and test phases, the architecture generally comprises the two cascaded ML-based models. The first artificial neural network model MODEL 1 generally follows an end-to-end approach, as MODEL 1 takes the set of raw images 106a-106n as input and generates the set of IQ parameters 112 as output. The second artificial neural network model MODEL 2 evaluates the results coming from the first artificial neural network model MODEL 1 and generates a loss signal LOSS based on the comparison with the set of reference images 108a-108n. The second artificial neural network model MODEL 2 generally allows the iterative training of the first artificial neural network model MODEL 1 according to generated loss.

In various embodiments, the first artificial neural network model MODEL 1 follows an end-to-end approach. Given the set of raw images 106a-106n and the set of reference images 108a-108n embedding the desired characteristics, the first artificial neural network model MODEL 1 generates the set of IQ parameters 112. The first artificial neural network model MODEL 1 gets trained on the loss signal from the second artificial neural network model MODEL 2. Optionally, instead of a real end-to-end approach based on neural networks, the first artificial neural network model MODEL 1 may be constituted of several computer vision blocks, each mimicking a specific image signal processing (ISP) function. In an example, the computer vision blocks may be based on both ML methods and proprietary expertise on computer vision, possibly introducing configuration parameters that may be set up by the user or by engineering practice.

In various embodiments, the second artificial neural network model MODEL 2 is paired with the block 120 comprising the IDSP pipeline model that applies the set of IQ parameters 112 (or 116 when post-processing is implemented) on the set of raw images 106a-106n. The second artificial neural network model MODEL 2 compares the new images obtained by the application of the IQ parameters on the set of raw images 106a-106n with the set of reference images 108a-108n embedding the desired characteristics. To apply the IQ parameters on the set of raw images 106a-106n, the IDSP pipeline model 120 needs to replicate the results of the IDSP pipeline 92. In various embodiments, this may be achieved by either connecting the IQ parameter tuning tool 100 to the actual HW system, or building a software IDSP emulator. In general, a new set of processed images produced by the application of the set of IQ parameters 112 is obtained.

Finally, the new set of processed images is compared against the set of reference images 108a-108n embedding the desired characteristics to check whether the two sets share the main visual characteristics. Similar to first artificial neural network model MODEL 1, the comparison between the two sets of images may be based either on a neural network model or some engineering expertise, or a combination of the two. The second artificial neural network model MODEL 2 is mainly used during the training phase of the first artificial neural network model MODEL 1. However, the second artificial neural network model MODEL 2 may also be exploited at an evaluation stage (e.g., performing the same operations on a new set of raw images). The second artificial neural network model MODEL 2 generally acts as a "teacher" for the first artificial neural network model MODEL 1, by providing the loss signal LOSS that is only based on visual characteristics and not on the actual content of the images.

In various embodiments, the image quality parameter tuning tool 100 may be trained in a semi-supervised fashion, since the ML-based model needs to learn an embedded representation of the visual characteristics with some feedbacks that may be provided by human expertise. In an example, instead of model training happening on request, a continuous improvement approach may be followed whenever new images, labels, historical results, etc., become available. In an example, when the first artificial neural network model MODEL 1 is properly built and trained, only one image per scenario of interest may be needed (e.g., for an automotive application: one image shot on the road during the day, one shot in a garage during the night, etc.). In an example, when the second artificial neural network model MODEL 2 is properly built and trained, only one image for each extreme condition of interest would be needed (e.g., one image shot during the day, one during the night, one with a source of light directly in front of the camera, etc.). In general, the set of reference images 108a-108n is not the output goal of the second artificial neural network model MODEL 2. Rather, the set of reference images 108a-108n generally provides the desired visual characteristics that the first artificial neural network model MODEL 1 needs to learn to replicate on the set of raw images 106a-106n. As such, the set of reference images 108a-108n may be obtained from an already tuned camera module, or even downloaded from a dataset on the internet.

The circuit 100 may also implement the training mode utilizing the second artificial neural network model MODEL 2 to train the first ML-based model on the SoC 82. In the training mode, the training process may utilize the second artificial neural network model MODEL 2 with a hardware (HW) implementation (or equivalent software (SW) emulation) of an image digital signal processing (IDSP) pipeline model. In some embodiments, the training process may utilize the IDSP pipeline of the circuit 92 during the training mode. In embodiments utilizing the IDSP pipeline of the circuit 92, the circuit 100 may have a third input that may receive the processed image data from the circuit 92 via the signal FRAMES. In the training mode, the training process may utilize the second artificial neural network model MODEL 2 to generate the signal LOSS based on the set of raw images 106a-106n, the one or more reference images 108a-108n, and the loss function embodied in the training of the second artificial neural network model MODEL 2. The signal LOSS generally communicates a result (or loss) of the loss function. The second artificial neural network model MODEL 2 is generally configured (trained) to evaluate the results coming from the first artificial neural network model MODEL 1 and generate the signal LOSS based on comparison of the results coming from the first artificial neural network model MODEL 1 with the one or more reference images 108a-108n received at the second input. The second artificial neural network model MODEL 2 generally allows an iterative training process of the first artificial neural network model MODEL 1 according to the evaluated loss.

Figure 4:
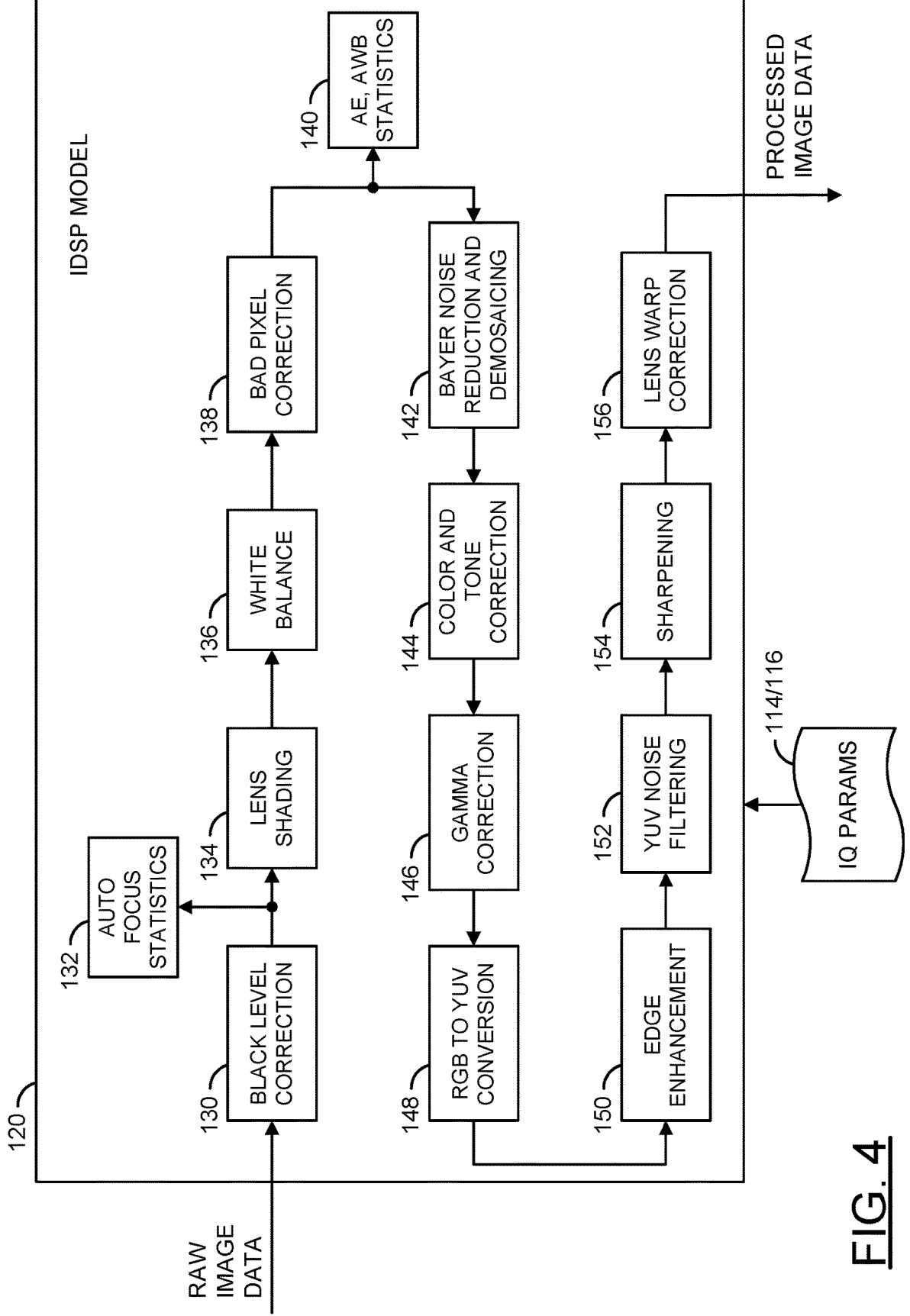
FIG. 4 is a diagram illustrating an example model of an image digital signal processing pipeline in accordance with an embodiment of the invention.

Referring to FIG. 4, a diagram is shown illustrating an example of the image digital signal processing (IDSP) pipeline model 120 of FIG. 2. In an example, the IDSP pipeline model 120 generally models operations of the IDSP pipeline 92 of FIG. 1. In various embodiments, the IDSP model 120 may implement a IDSP pipeline for converting raw image data acquired from an image sensor format to a YUV picture format. In some embodiments, the IDSP model 120 may model individual blocks (or circuits) of the IDSP pipeline. A camera system needs be able to take quality images in a variety of lighting conditions, including, but not limited to, indoors, in strong sunlight, and in darkness. Video sequences and still images can lose colors and critical details, and gain image noise in dim light. Many elements make up a camera system and work together to obtain a final image.

Image quality defines how well a camera system performs when reproducing an object or a scene. Various characteristics of the camera system including, but not limited to, sensor type and characteristics, firmware, and lens characteristics may contribute different elements to the overall quality of an image. Image quality parameter tuning is generally needed to achieve the best image/video quality from the camera system. Image quality parameters that may need to be tuned may relate to lens distortion, sensor defects, noise, color response, variations in mechanical, optical systems, and electrical characteristics, measurement criteria including automatic exposure (AE) with brightness and saturation statistics, automatic focus (AF) with contrast statistics, and automatic white balance (AWB) with color, statistics, black level correction, lens distortion correction, sensor defect detection, spatial and temporal noise reduction, Bayer demosaicing, color and tone correction, brightness and saturation, contrast, sharpness, white balance, autofocus statistics, auto-exposure statistics, automatic white balance statistics, lens shading correction, color space conversion, gamma correction, dynamic range, electronic image stabilization, decompanding, anti-aliasing, chromatic aberration, digital gain, vignette compensation, and statistics extraction. Image quality parameter tuning may also be needed due to individual subjective image quality preferences. Unprocessed images generally do not accurately depict an actual scene. An IDSP pipeline is used to obtain the highest image quality possible. In general, a camera system pairs a lens module with an image sensor and an IDSP pipeline.

The IDSP pipeline processes the raw image from the image sensor to a final (processed) image. In order to achieve the best image quality, the IQ parameters of the IDSP pipeline need to be configured iteratively for various lighting conditions and scenarios. In an example, an IDSP pipeline may comprise a number of blocks (or modules). Because each block may affect performance of subsequent blocks, image quality parameter tuning needs to be performed for each of the blocks of the IDSP pipeline. The tuning process generally involves calculating different parameters of the camera system (e.g., dark current, sensor RGB color space, noise model, AWB reference values, distortion model, etc.) to derive initial settings for each of the modules of the IDSP pipeline. In an example, the initial camera parameters may be calculated from images of standard test charts taken at specific and controlled lighting conditions.

In various embodiments, the IDSP pipeline model 120 may comprise, but is not limited to, a step (or stage) 130, a step (stage) 132, a step (or stage) 134, a step (or stage) 136, a step (or stage) 138, a step (or stage) 140, a step (stage) 142, a step (or stage) 144, a step (or stage) 146, a step (or stage) 148, a step (or stage) 150, a step (stage) 152, a step (or stage) 154, and a step (or stage) 156. The step 130 may perform black level correction on the raw image data. The step 132 may extract auto focus statistics. The step 134 may perform lens shading correction. The step 136 may perform a white balancing operation. The step 138 may perform bad pixel correction. The step 138 may present color filter array (CFA) formatted image data. The step 140 may extract auto-exposure and/or automatic white balance statistics. The step 142 may perform Bayer noise reduction and demosaicing on the CFA formatted image data to obtain linear RGB (red, green, blue) image data for each picture element (pixel). The step 144 may perform color and tone correction. The step 146 may perform gamma correction on the linear RGB (red, green, blue) image data to obtain non-linear RGB (red, green, blue) image data for each picture element (pixel). The step 148 may perform RGB to YUV color space conversion. The step 150 may perform edge enhancement. The step 152 may perform YUV noise filtering (e.g., noise reduction, noise correction, etc.). The step 154 may perform sharpening operations. The step 156 may perform lens warping correction. An output of the step 156 may present the final processed images. The steps 130-156 may apply the IQ parameters generated in accordance with an embodiment of the invention using conventional techniques for processing the raw image data. Noise reduction and/or sharpening need not be limited to the steps 142 and 152, but may be utilized at one or multiple points in the pipeline steps 130-156. The steps 130-156 may be implement as a number of blocks (or circuits) in a hardware (HW) implementation (or equivalent software (SW) emulation) of the image digital signal processing (IDSP) pipeline model.

Noise characteristics vary based on the image data itself and also vary, or are shaped, as the data is processed through the IDSP pipeline. Typically, the sensor picture has additive noise (e.g., noise magnitude is independent of the sensor data) and photon noise (e.g., noise due to the discrete nature of photons). The latter increases with brightness. For example, if ideally (e.g., averaged over taking the same picture many times), pixel A would measure 100 photons and pixel B would measure 1,000 photons, more variation (e.g., more noise) would be expected in the absolute number of photons for pixel B compared to pixel A. Hence, a sensor picture will typically have higher noise in brighter pixels.

White balance typically scales (e.g., applies gains to) each of the color channels (e.g., Red, Green, and Blue values) by a different amount. The different scaling amounts also scale noise, so colors with higher white balance gains will typically be noisier. For example, if the Red, Green, and Blue gains are 1.5, 1, and 2, respectively, then after white balance Blue may be expected to be the noisiest and Green the cleanest.

Color and tone correction can also affect noise. A tone curve typically has a large slope for dark values and a small slope for bright values; this will increases noise in dark areas compared to bright areas. Because the pixels start out with lower noise in dark areas, typical behavior is that the darkest and brightest areas are lowest in noise and those areas in the middle (e.g., midtones) are noisiest. Moreover, color correction, which mixes input RGB, can make some colors noisier than others.

Figure 5:
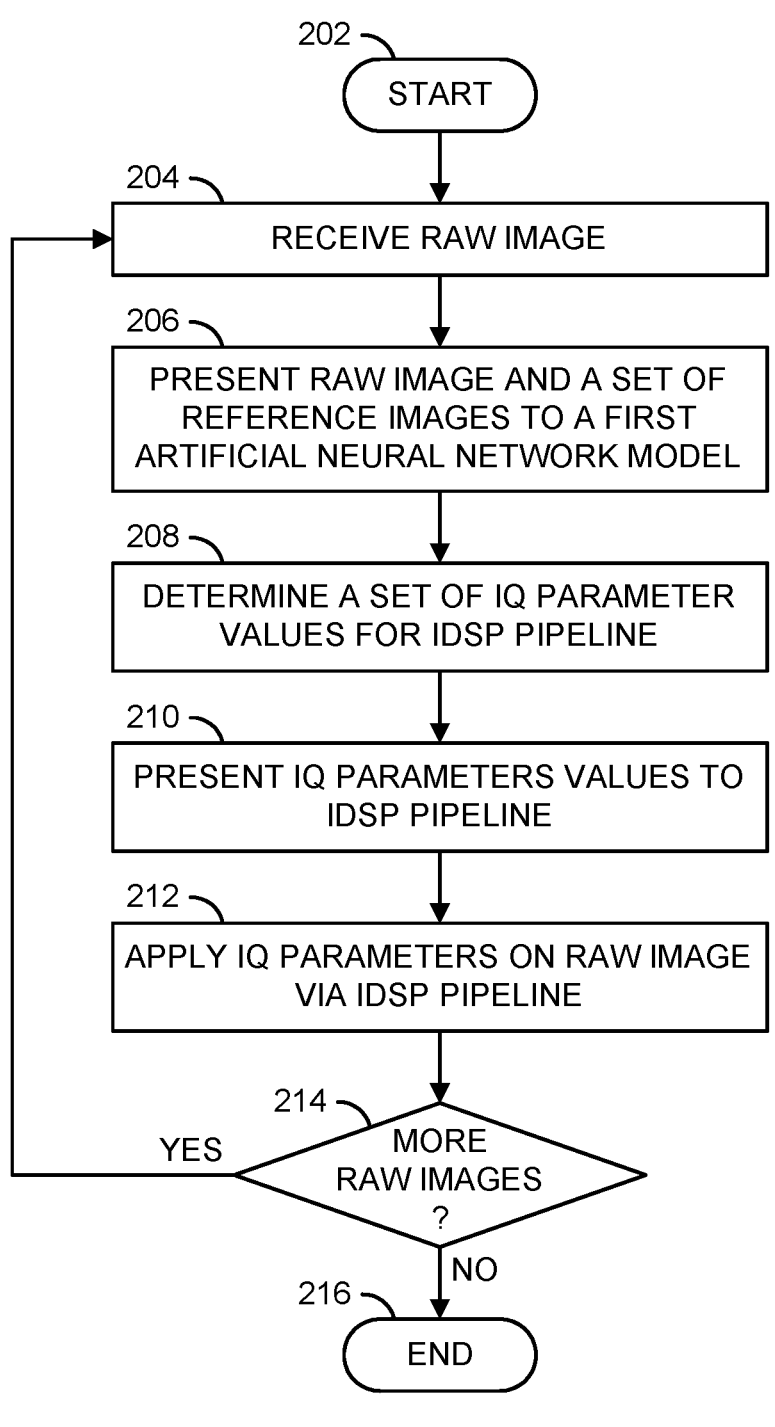
FIG. 5 is a diagram illustrating a tuning process in accordance with an embodiment of the invention.

Referring to FIG. 5, a diagram is shown illustrating a tuning process in accordance with an embodiment of the invention. In an example, a process (or method) 200 may implement an image quality parameter tuning process to tune image quality parameters utilized in an image digital signal processing (IDSP) pipeline of a camera system during an operating mode. In an example, the process 200 may comprise a step (or state) 202, a step (or state) 204, a step (or state) 206, a step (or state) 208, a step (or state) 210, a step (or state) 212, a decision step (or state) 214, and a step (or state) 216. The process 200 may begin in the step 202, and move to the step 204. In the step 204, the process 200 may receive a raw image. In the step 206, the process 200 may present the raw image and a set of reference images as inputs to a first artificial neural network model (e.g., MODEL 1 described above).

In the step 208, the first artificial neural network model may be executed to determine a set of image quality parameter values for an IDSP pipeline of a camera system. In the step 210, the process 200 may present the set of image quality parameter values to the IDSP pipeline of the camera system. In the step 212, the IDSP pipeline may apply the set of image quality parameter values on the raw image to produce a processed image having desired visual characteristics. In the decision step 214, the process 200 may determine whether there are further raw images to be processed. When further raw images are available, the process 200 may return to the step 204. When further raw images are not available, the process 200 may move to the step 216 and terminate.

Figure 6:
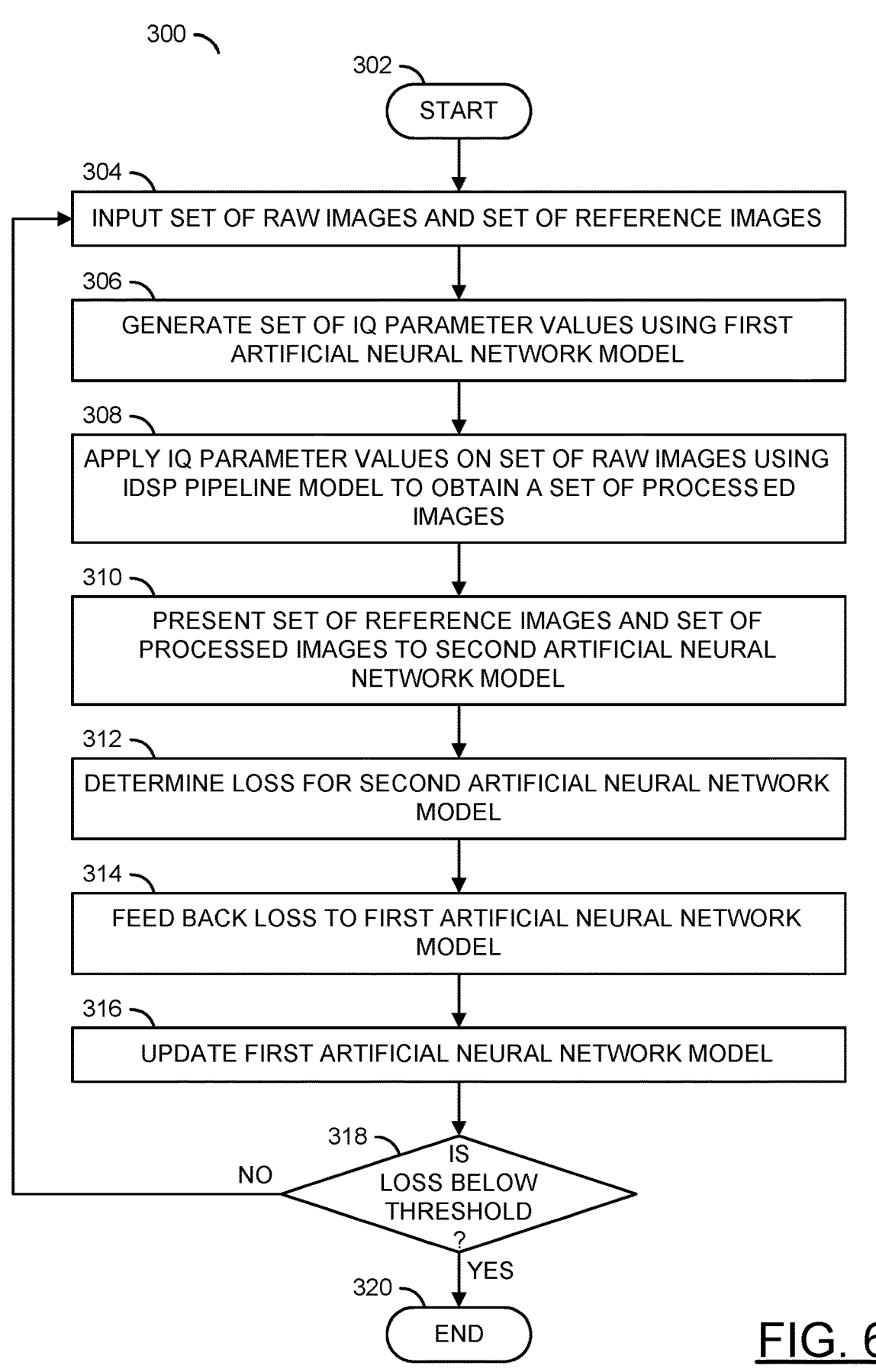
FIG. 6 is a diagram illustrating a training process in accordance with an embodiment of the invention.

Referring to FIG. 6, a diagram is shown illustrating a training process in accordance with an embodiment of the invention. In an example, a process (or method) 300 may be implemented to train the first artificial neural network model 110 of the image quality parameter tuning tool 100. In an example, the process 300 may comprise a step (or state) 302, a step (or state) 304, a step (or state) 306, a step (or state) 308, a step (or state) 310, a step (or state) 312, a step (or state) 314, a step (or state) 316, a decision step (or state) 318, and a step (or state) 320. The process 300 may begin in the step 302, and move to the step 304. In the step 304, the process 300 may input the set of raw images 106a-106n and the set of reference images 108a-108n. In the step 306, the process 300 may generate a set of IQ parameter values based on the set of raw images 106a-106n and the set of reference images 108a-108n. The set of IQ parameter values may be generated using either the first artificial neural network model 110 alone (e.g., the IQ parameters 112) or the first artificial neural network model 110 in combination with the post processing circuit 114 (e.g., the IQ parameters 116).

In the step 308, the process 300 generates a set of processed images by applying the set of IQ parameter values on the set of raw images 106a-106n using the IDSP pipeline model 120. In the step 310, the process 300 presents the set of reference images and the set of processed images as inputs to the second artificial neural network model 122. In the step 312, the second artificial neural network model 122 is generally executed to determine a loss 124. In the step 314, the loss 124 of the second artificial neural network model 122 may be fed back (e.g., back propagated) to the first artificial neural network model 110.

In the step 316, the first artificial neural network model 110 may be updated (e.g., internal neural network parameters such as weights adjusted, etc.) based upon the loss 124. In the decision step 318, the process 300 may determine whether the loss 124 meets or exceeds a predetermine threshold. When the loss 124 does not meet or exceed the predetermine threshold, the process 300 returns to the step 304 to perform another iteration. In each iteration, the intermediate IQ parameter values are applied to the raw images using the IDSP pipeline model 120 to obtain a new set of processed images, which are evaluated (critiqued) against the set of reference images 108a-108n by the second artificial neural network model 122. When the loss 124 meets or exceeds the predetermined threshold, the process 300 moves to the step 320 and terminates. When the loss 124 determined by the second artificial neural network model 122 meets or exceeds the predetermined threshold, the first artificial neural network model 110 may be considered ready (trained) to be ported to a selected system.

Figure 7:
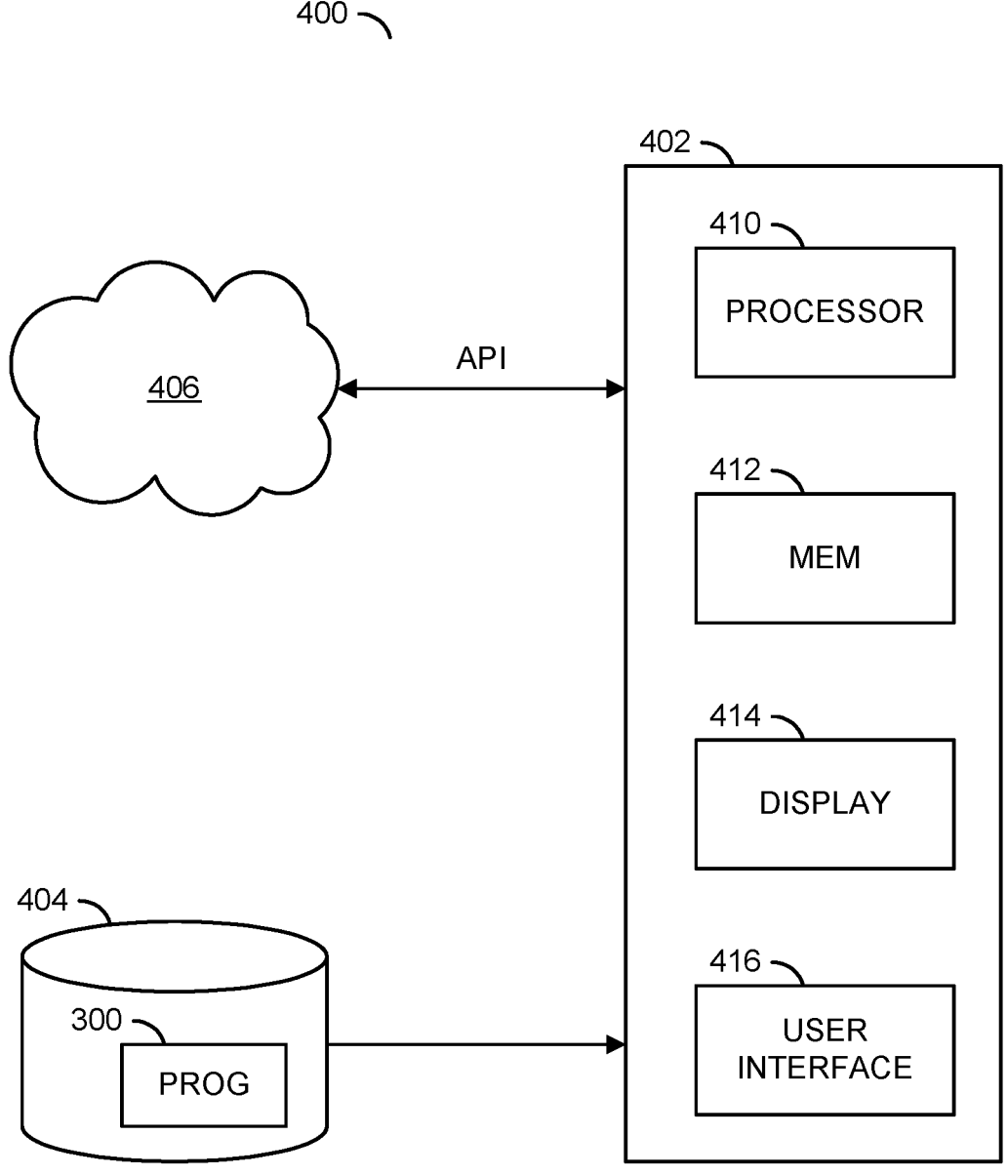
FIG. 7 is a diagram illustrating an example of a computer system in which the process of FIG. 6 may be implemented.

Referring to FIG. 7, a diagram is shown illustrating an example of a host computer system in which the process 300 of FIG. 6 may be implemented offline. In an example, a system 400 may be configured (e.g., through software) to perform the process 300 on a previously generated neural network model. In an example, the system 400 may comprise a computer 402 and a computer readable storage medium 404. In an example, the computer 402 may be implemented as a general purpose computer system on which software implementing the process 300 may be executed. In an example, the computer readable storage medium 404 may include, but is not limited to, a magnetic storage medium (e.g., a hard disk drive or HDD), an optical storage medium (e.g., compact disc (CD), digital video disc (DVD), BluRay disc (BD), a solid state drive (SSD), a network associated storage system (NAS), and/or cloud-based storage resources. In an example, the computer 402 and the computer readable storage medium 404 may be coupled together to exchange programs and data. In an example, a program (or programs) implementing the process 300 may be stored on the computer readable storage medium 404 or in cloud-based resources 406. In an example, the computer 402 may be further configured to perform the process 300 utilizing the cloud-based resources 406. In an example, the computer 402 may be configured to perform the process 300 via an application program interface (API).

In an example, the computer 402 may include, but is not limited to, a processor 410, memory 412, a display 414, and a user interface 416. In various embodiments, the processor 410 may include, but is not limited to, a central processing unit (CPU), a graphics processing unit (GPU), a video processing unit (VPU), a general vector processor (GVP), and/or a neural network vector processor (NNVP). In various embodiments, the memory 412 may include, but is not limited to, random access memory (e.g., SRAM, DRAM, FLASH, etc.), read only memory (ROM), and cache memory. The display 414 and the user interface 416 generally allow a user to initiate and monitor the computer 402 performing the process 300.

Figure 8:
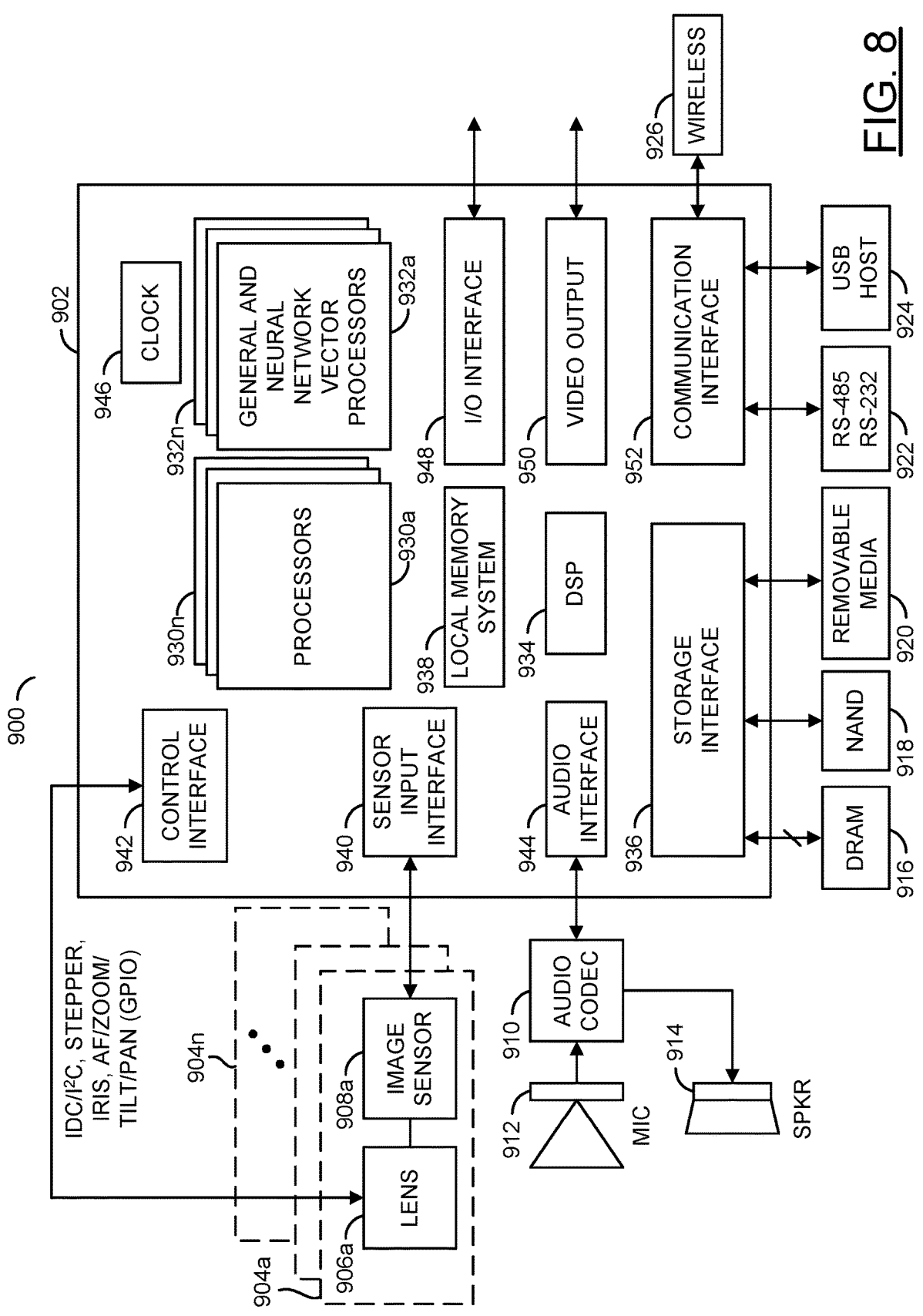
FIG. 8 is a diagram illustrating a camera system on chip capable of implementing an image quality parameter tuning process in accordance with an embodiment of the invention.

Referring to FIG. 8, a diagram is shown illustrating a camera system 900 capable of implementing an image quality parameter tuning process in accordance with an embodiment of the invention. In an example, the electronics of the camera system 900 may be implemented as one or more integrated circuits. In an example, the camera system 900 may be built around a processor/camera chip (or circuit) 902. In an example, the processor/camera chip 902 may be implemented as an application specific integrated circuit (ASIC) or system on chip (SOC). The processor/camera circuit 902 generally incorporates hardware and/or software/firmware that may be configured to implement the processors, circuits, and processes described above in connection with FIG. 2 through FIG. 6.

In an example, the processor/camera circuit 902 may be connected to a number of image capture devices 904a-904n. In some embodiments, the image capture devices 904a-904n may be a component of the processor/camera circuit 902 (e.g., a SoC component). In some embodiments, the image capture devices 904a-904n may be a separate component from the processor/camera circuit 902 (e.g., the image capture devices 904a-904n may be an interchangeable component compatible with the processor/camera circuit 902). In some embodiments, the image capture devices 904a-904n may be part of a separate camera connected to the processor/camera circuit 902 (e.g., via a video cable, a high definition media interface (HDMI) cable, a universal serial bus (USB) cable, an Ethernet cable, or wireless link).

Each of the image capture devices 904a-904n may comprise a block (or circuit) 906a-906n and/or a block (or circuit) 908a-908n. The circuits 906a-906n may be associated with a lens assembly. The circuits 908a-908n may be image sensor assemblies. The image capture devices 904a-904n may comprise other components (not shown). The number, type and/or function of the components of the image capture devices 904a-904n may be varied according to the design criteria of a particular implementation.

The lens assembly 906a may capture and/or focus light input received from the environment near a camera. The lens assembly 906a may capture and/or focus light for the image sensor 908a. The lens assembly 906a may implement an optical lens. The lens assembly 906a may provide a zooming feature and/or a focusing feature. The lens assembly 906a may be implemented with additional circuitry (e.g., motors) to adjust a direction, zoom and/or aperture of the lens assembly 906a. The lens assembly 906a may be directed, tilted, panned, zoomed and/or rotated to provide a targeted view of the environment near the camera.

The image sensor 908a may receive light from the lens assembly 906a. The image sensor 908a may be configured to transform the received focused light into digital data (e.g., bitstreams). In some embodiments, the image sensor 908a may perform an analog to digital conversion. For example, the image sensor 908a may perform a photoelectric conversion of the focused light received from the lens assembly 906a. The image sensor 908a may present converted image data as a color filter array (CFA) formatted bitstream. The processor/camera circuit 902 may transform the bitstream into video data, video files and/or video frames (e.g., human-legible content).

The processor/camera circuit 902 may also be connected to (i) an optional audio input/output circuit including an audio codec 910, a microphone 912, and a speaker 914, (ii) an external memory 916, which may include dynamic random access memory (DRAM), (iii) a non-volatile memory (e.g., NAND flash memory) 918, a removable media (e.g., SD, SDXC, etc.) 920, one or more serial (e.g., RS-485, RS-232, etc.) devices 922, one or more universal serial bus (USB) devices (e.g., a USB host) 924, and a wireless communication device 926.

In various embodiments, the processor/camera circuit 902 may comprise a number of blocks (or circuits) 930a-930n, a number of blocks (or circuits) 932a-932n, a block (or circuit) 934, a block (or circuit) 936, a block (or circuit) 938, a block (or circuit) 940, a block (or circuit) 942, a block (or circuit) 944, a block (or circuit) 946, a block (or circuit) 948, a block (or circuit) 950, and/or a block (or circuit) 952. In various embodiments, the circuits 930a-930n may include one or more embedded processors (e.g., ARM, etc.). In various embodiments, the circuits 932a-932n may include one or more general vector processors (GVPs) and/or neural network vector processors (NVPs). In an example, circuits 932a-932n may provide high-performance and power-efficient neural network computing. In an example, the NVPs may provide resources for implementing neural network models and other AI applications. The GVPs may provide resources for accelerating classical computer vision and radar processing. In an example, one or more of the circuits 932a-932n may implement an image quality parameter tuning tool in accordance with an example embodiment of the invention. The circuit 934 may be a digital signal processing (DSP) module. In some embodiments, the circuit 934 may implement separate image DSP and video DSP modules. In an example, the circuit 934 may implement an image DSP pipeline in accordance with an embodiment of the invention.

The circuit 936 may be a storage interface. The circuit 936 may interface the processor/camera circuit 902 with the DRAM 916, the non-volatile memory 918, and the removable media 920. One or more of the DRAM 916, the non-volatile memory 918, and/or the removable media 920 may store computer readable instructions. The computer readable instructions may be read and executed by the processors 930a-930n. In response to the computer readable instructions, the processors 930a-930n may be operational to operate as controllers for the processors 932a-932n. For example, the processors 932a-932n may provide resources configured to efficiently perform various specific operations in hardware and the processors 930a-930n may be configured to make decisions about how to handle input/output to/from the various resources.

The circuit 938 may implement a local memory system. In some embodiments, the local memory system 938 may include, but is not limited to a cache (e.g., L2CACHE), a direct memory access (DMA) engine, graphic direct memory access (GDMA) engine, and fast random access memory. In an example, a directed acyclic graph (DAG) memory 968 may be implemented in the local memory system 938. The circuit 940 may implement a sensor input (or interface). The circuit 942 may implement one or more control interfaces including but not limited to an inter device communication (IDC) interface, an inter integrated circuit ($I^2C$) interface, a serial peripheral interface (SPI), and a pulse width modulation (PWM) interface. The circuit 944 may implement an audio interface (e.g., an $I^2S$ interface, etc.). The circuit 946 may implement a clock circuit including but not limited to a real time clock (RTC), a watchdog timer (WDT), and/or one or more programmable timers. The circuit 948 may implement an input/output (I/O) interface. The circuit 950 may be a video output module. The circuit 952 may be a communication module. The circuits 930a-930n, 932a-932n, and 934 through 952 may be connected to each other using one or more buses, interfaces, traces, protocols, etc.

The circuit 918 may be implemented as a nonvolatile memory (e.g., NAND flash memory, NOR flash memory, etc.). The circuit 920 may comprise one or more removable media cards (e.g., secure digital media (SD), secure digital extended capacity media (SDXC), etc.). The circuit 922 may comprise one or more serial interfaces (e.g., RS-485, RS-232, etc.). The circuit 924 may be an interface for connecting to or acting as a universal serial bus (USB) host. The circuit 926 may be a wireless interface for communicating with a user device (e.g., a smart phone, a computer, a tablet computing device, cloud resources, etc.). In various embodiments, the circuits 904-926 may be implemented as components external to the processor/camera circuit 902. In some embodiments, the circuits 904-926 may be components on-board the processor/camera circuit 902.

The control interface 942 may be configured to generate signals (e.g., IDC/I2C, STEPPER, IRIS, AF/ZOOM/TILT/PAN, etc.) for controlling the image capture devices 904a-904n. The signal IRIS may be configured to adjust an iris for the lens assembly 906a. The interface 942 may enable the processor/camera circuit 902 to control the image capture devices 904a-904n.

The storage interface 936 may be configured to manage one or more types of storage and/or data access. In one example, the storage interface 936 may implement a direct memory access (DMA) engine and/or a graphics direct memory access (GDMA) In another example, the storage interface 936 may implement a secure digital (SD) card interface (e.g., to connect to the removable media 920). In various embodiments, programming code (e.g., executable instructions for controlling various processors and encoders of the processor/camera circuit 902) may be stored in one or more of the memories (e.g., the DRAM 916, the NAND 918, etc.). When executed by one or more of the processors 930a-930n, the programming code generally causes one or more components in the processor/camera circuit 902 to configure video synchronization operations and start video frame processing operations. The resulting compressed video signal may be presented to the storage interface 936, the video output 950 and/or communication interface 952. The storage interface 936 may transfer program code and/or data between external media (e.g., the DRAM 916, the NAND 918, the removable media 920, etc.) and the local (internal) memory system 938.

The sensor input 940 may be configured to send/receive data to/from the image sensor 908a. In one example, the sensor input 940 may comprise an image sensor input interface. The sensor input 940 may be configured to transmit captured images (e.g., picture element, pixel, data) from the image sensor 908a to the DSP module 934, one or more of the processors 930a-930n, and/or one or more of the processors 932a-932n. The data received by the sensor input 940 may be used by the DSP 934 to determine a luminance (Y) and chrominance (U and V) values from the image sensor 908a. The sensor input 940 may provide an interface to the image capture devices 904a-904n. The sensor input interface 940 may enable the processor/camera circuit 902 to capture image data from the image capture devices 904a-904n.

The audio interface 944 may be configured to send/receive audio data. In one example, the audio interface 944 may implement an audio inter-IC sound (I²S) interface. The audio interface 944 may be configured to send/receive data in a format implemented by the audio codec 910.

The DSP module 934 may be configured to process digital signals. The DSP module 934 may comprise an image digital signal processor (IDSP), a video digital signal processor DSP (VDSP), and/or an audio digital signal processor (ADSP). The IDSP may implement an image digital signal processing pipeline in accordance with an embodiment of the invention. The DSP module 934 may be configured to receive information (e.g., pixel data values captured by the image sensor 908a) from the sensor input 940. The DSP module 934 may be configured to determine the pixel values (e.g., RGB, YUV, luminance, chrominance, etc.) from the information received from the sensor input 940. The DSP module 934 may be further configured to support or provide a sensor RGB to YUV raw image pipeline to improve image quality, bad pixel detection and correction, demosaicing, white balance, color and tone correction, gamma correction, adjustment of hue, saturation, brightness and contrast adjustment, chrominance and luminance noise filtering, etc. In an example, the IDSP of the DSP module 934 may be implemented similar to the IDSP 92 described above in connection with FIGS. 2-4.

The I/O interface 948 may be configured to send/receive data. The data sent/received by the I/O interface 948 may be miscellaneous information and/or control data. In one example, the I/O interface 948 may implement one or more of a general purpose input/output (GPIO) interface, an analog-to-digital converter (ADC) module, a digital-to-ana-log converter (DAC) module, an infrared (IR) remote interface, a pulse width modulation (PWM) module, a universal asynchronous receiver transmitter (UART), an infrared (IR) remote interface, and/or one or more synchronous data communications interfaces (IDC SPI/SSI).

The video output module 950 may be configured to send video data. For example, the processor/camera circuit 902 may be connected to an external device (e.g., a TV, a monitor, a laptop computer, a tablet computing device, etc.). The video output module 950 may implement a high-definition multimedia interface (HDMI), a PAL/NTSC interface, an LCD/TV/Parallel interface and/or a DisplayPort interface.

The communication module 952 may be configured to send/receive data. The data sent/received by the communication module 952 may be formatted according to a particular protocol (e.g., Bluetooth®, ZigBee®, USB, Wi-Fi, UART, etc.). In one example, the communication module 952 may implement a secure digital input output (SDIO) interface. The communication module 952 may include support for wireless communication by one or more wireless and/or cellular protocols such as Bluetooth®, ZigBee®, Z-Wave, LoRa, Wi-Fi IEEE 802.11a/b/g/n/ac, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/ WiMAX, 5G, SMS, LTE M, NB-IoT, etc.

The communication module 952 may also include support for communication using one or more of the universal serial bus protocols (e.g., USB 1.0, 2.0, 3.0, etc.). The processor/ camera circuit 902 may also be configured to be powered via a USB connection. However, other communication and/or power interfaces may be implemented accordingly to meet the design criteria of a particular application.

The processor/camera circuit 902 may be configured (e.g., programmed) to control the one or more lens assemblies 906a-906n and the one or more image sensors 908a-908n. The processor/camera circuit 902 may receive raw image data from the image sensor(s) 908a-908n. The processor/ camera circuit 902 may encode the raw image data into a plurality of encoded video streams simultaneously (in parallel). The plurality of video streams may have a variety of resolutions (e.g., VGA, WVGA, QVGA, SD, HD, Ultra HD, 4K, etc.). The processor/camera circuit 902 may receive encoded and/or uncoded (e.g., raw) audio data at the audio interface 944. The processor/camera circuit 902 may also receive encoded audio data from the communication interface 952 (e.g., USB and/or SDIO). The processor/camera circuit 902 may provide encoded video data to the wireless interface 926 (e.g., using a USB host interface). The wireless interface 926 may include support for wireless communication by one or more wireless and/or cellular protocols such as Bluetooth®, ZigBee®, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The processor/camera circuit 902 may also include support for communication using one or more of the universal serial bus protocols (e.g., USB 1.0, 2.0, 3.0, etc.).

Figure 9:
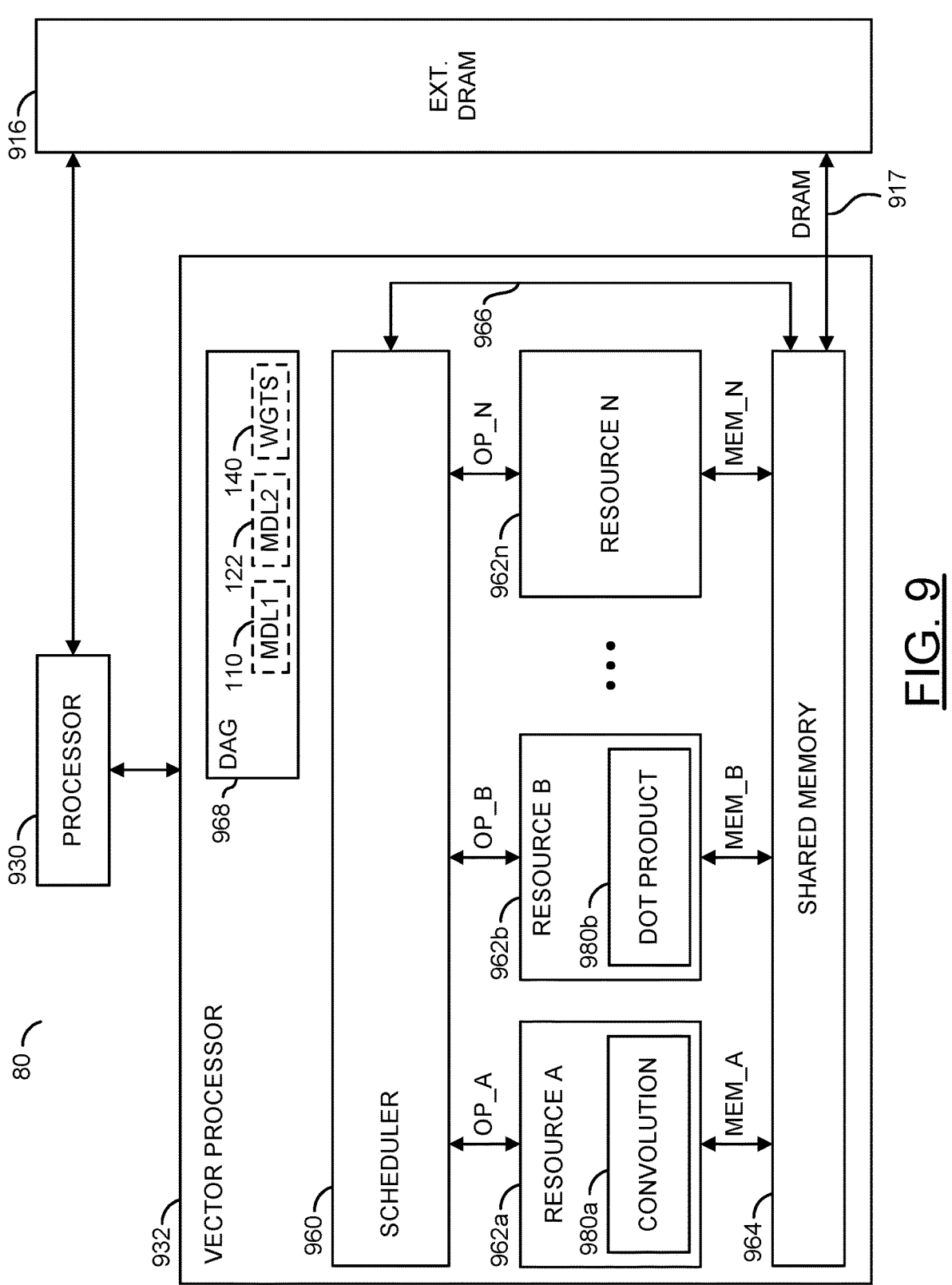
FIG. 9 is a diagram illustrating a context in which an image quality parameter tuning process in accordance with an example embodiment of the invention may be implemented.

Referring to FIG. 9, a diagram is shown illustrating a context in which an image quality parameter tuning process in accordance with an example embodiment of the invention may be implemented. The camera system (or apparatus) 80 may be implemented as part of a computer (or machine) vision system. In various embodiments, the camera system 80 may be implemented in an edge device. In an example, the camera system 80 may be implemented as part of a camera, a computer, a server (e.g., a cloud server), a smart phone (e.g., a cellular telephone), a personal digital assistant, etc. The camera system 80 may be configured for applications including, but not limited to autonomous and semi-autonomous vehicles (e.g., cars, trucks, motorcycles, agricultural machinery, drones, airplanes, etc.), manufacturing, and/or security and surveillance systems. In contrast to a general purpose computer, the system 80 generally comprises hardware circuitry that is optimized to provide high performance image processing and computer vision pipeline (s) in minimal area and with minimal power consumption. In an example, various operations used to perform image processing, feature detection/extraction, and/or object detection for computer (or machine) vision may be implemented using hardware modules designed to reduce computational complexity and use resources efficiently.

In an example embodiment, the camera stem 80 may be implemented using the processor/SoC 902 of FIG. 8. In an example embodiment, the camera system 80 may comprises a block (or circuit) 930, a block (or circuit) 932, a block (or circuit) 916, and/or a memory bus 917. The circuit 930 may implement a first processor. The circuit 932 may implement a second processor. The circuit 916 may implement an external memory (e.g., a memory external to the circuits 930 and 932). In an example, the circuit 932 may implement a vector processor. In an example, the processor 932 may be an intelligent vision processor. The system 80 may comprise other components (not shown). The number, type, and/or arrangement of the components of the system 80 may be varied according to the design criteria of a particular implementation.

The circuit 930 may implement a processor circuit. In some embodiments, the processor circuit 930 may be a general purpose processor circuit. The processor circuit 930 may be operational to interact with the circuit 932 and the circuit 916 to perform various processing tasks. In an example, the processor 930 may be configured as a controller for the circuit 932. The processor 930 may be configured to execute computer readable instructions. In one example, the computer readable instructions may be stored by the circuit 916. In some embodiments, the computer readable instructions may comprise controller operations. The processor 930 may be configured to communicate with the circuit 932 and/or access results generated by components of the circuit 932. In an example, the processor 930 may be configured to utilize the circuit 932 to perform operations associated with preprocessing networks and/or artificial neural network models. In another example, the processor 930 may be configured to program the circuit 932 with the artificial neural network models (e.g., as directed acyclic graphs or DAGs) of the image quality parameter tuning tool 100 in accordance with an example embodiment of the invention. In an example, the circuit 932 may be programmed with the first artificial neural network model 110, the second artificial neural network model 122, and sets of weights (WGTS) 140. In an example, the first artificial neural network model 110 may be implemented as a convolutional neural network (CNN) configured to implement an image quality parameter generating process in accordance with an embodiment of the invention. In an example, the second artificial neural network model 122 may be implemented as a convolutional neural network (CNN) configured to generate a loss signal based upon a set of reference images and a set of processed images generated by an actual image digital signal processing pipeline or a model of the actual image digital signal processing pipeline using a set of image quality parameters generated by the neural network model 110. In an example, the processor 930 may be further configured to program the circuit 932 with all or a portion of a software model of the actual image digital signal processing pipeline. The operations performed by the processor 930 may be varied according to the design criteria of a particular implementation.

In various embodiments, the circuit 916 may implement a dynamic random access memory (DRAM) circuit. The DRAM circuit 916 is generally operational to store multi-dimensional arrays of input data elements and various forms of output data elements. The DRAM circuit 916 may exchange the input data elements and the output data elements between the processor circuit 930 and the processor circuit 932.

The circuit 932 may implement a vector processor circuit. In an example, the circuit 932 may be configured to implement various functionality used for computer (or machine) vision. The processor circuit 932 is generally operational to perform specific processing tasks as arranged by the processor circuit 930. In various embodiments, the processor 932 may be implemented solely in hardware. In an example, the processor 932 may directly execute a data flow directed to image processing and object detection, and generated by software that specifies processing (e.g., image processing and computer vision) tasks. In some embodiments, the circuit 932 may be a representative example of numerous general and neural network vector processors implemented by the system 80 and configured to operate together.

The circuit 932 generally comprises a block (or circuit) 960, one or more blocks (or circuits) 962a-962n, a block (or circuit) 964, a path 966, and a block (or circuit) 968. The block 960 may implement a scheduler circuit. The blocks 962a-962n may implement hardware resources (or engines). The block 964 may implement a shared memory circuit. The block 968 may implement a directed acyclic graph (DAG) memory. In an example embodiment, one or more of the circuits 962a-962n may comprise blocks (or circuits) 980a-980n. In the example shown, a block 980a and a block 980b are implemented. In an example, the circuit 980a may implement convolution operations. In another example, the circuit 980b may be configured to provide dot product operations. The convolution and dot product operation may be used to perform computer (or machine) vision tasks (e.g., as part of an object detection process, etc.). In yet another example, one or more of the circuits 962c-962n may comprise blocks (or circuits) 980c-980n (not shown) to provide convolution calculations in multiple dimensions. An example implementation of a convolution calculation scheme that may be used by one or more of the circuits 962a-962n may be found in U.S. Pat. No. 10,310,768, issued Jun. 4, 2019, which is herein incorporated by reference in its entirety.

The circuit 932 may be configured to receive directed acyclic graphs (DAGs) from the processor 930. The DAGs received from the processor 930 may be stored in the DAG memory 968. The circuit 932 may be configured to execute DAGs for the first artificial neural network model 110 and the second artificial neural network model 122 using the circuits 960, 962a-962n, and 964. Multiple signals (e.g., OP_A to OP_N) may be exchanged between the circuit 960 and the respective circuits 962a-962n. Each signal OP_A to OP_N may convey execution operation information and/or yield operation information. Multiple signals (e.g., MEM_A to MEM_N) may be exchanged between the respective circuits 962a-962n and the circuit 964. The signals MEM_A to MEM_N may carry data. A signal (e.g., DRAM) may be exchanged between the circuit 916 and the circuit 964. The signal DRAM may transfer data between the circuits 916 and 964 (e.g., on the memory bus 917).

The circuit 960 may implement a scheduler circuit. The scheduler circuit 960 is generally operational to schedule tasks among the circuits 962a-962n to perform a variety of computer vision related tasks as defined by the processor circuit 930. Individual tasks may be allocated by the scheduler circuit 960 to the circuits 962a-962n. The scheduler circuit 960 may allocate the individual tasks in response to parsing the directed acyclic graphs provided by the processor 930. The scheduler circuit 960 may time multiplex the tasks to the circuits 962a-962n based on the availability of the circuits 962a-962n to perform the work. Each circuit 962a-962n may implement a processing resource (or hardware engine). The hardware engines 962a-962n are generally operational to perform specific processing tasks. The hardware engines 962a-962n may be implemented to include dedicated hardware circuits that are optimized for high-performance and low power consumption while performing the specific processing tasks. In some configurations, the hardware engines 962a-962n may operate in parallel and independent of each other. In other configurations, the hardware engines 962a-962n may operate collectively among each other to perform allocated tasks.

The hardware engines 962a-962n may be homogenous processing resources (e.g., all circuits 962a-962n may have the same capabilities) or heterogeneous processing resources (e.g., two or more circuits 962a-962n may have different capabilities). The hardware engines 962a-962n are generally configured to perform operators that may include, but are not limited to, a resampling operator, a warping operator, component operators that manipulate lists of components (e.g., components may be regions of a vector that share a common attribute and may be grouped together with a bounding box), a matrix inverse operator, a dot product operator, a convolution operator, conditional operators (e.g., multiplex and demultiplex), a remapping operator, a minimum-maximum-reduction operator, a pooling operator, a non-minimum, non-maximum suppression operator, a gather operator, a scatter operator, a statistics operator, a classifier operator, an integral image operator, an upsample operator and a power of two downsample operator, etc.

In various embodiments, the hardware engines 962a-962n may be implemented solely as hardware circuits. In some embodiments, the hardware engines 962a-962n may be implemented as generic engines that may be configured through circuit customization and/or software/firmware to operate as special purpose machines (or engines). In some embodiments, the hardware engines 962a-962n may instead be implemented as one or more instances or threads of program code executed on the processor 930 and/or one or more processors 932, including, but not limited to, a vector processor, a central processing unit (CPU), a digital signal processor (DSP), or a graphics processing unit (GPU). In some embodiments, one or more of the hardware engines 962a-962n may be selected for a particular process and/or thread by the scheduler 960. The scheduler 960 may be configured to assign the hardware engines 962a-962n to particular tasks in response to parsing the directed acyclic graphs stored in the DAG memory 968.

The circuit 964 may implement a shared memory circuit. The shared memory 964 may be configured to store data in response to input requests and/or present data in response to output requests (e.g., requests from the processor 930, the DRAM 916, the scheduler circuit 960 and/or the hardware engines 962a-962n). In an example, the shared memory circuit 964 may implement an on-chip memory for the vector processor 932. The shared memory 964 is generally operational to store all of or portions of the multidimensional arrays (or vectors) of input data elements and output data elements generated and/or utilized by the hardware engines 962a-962n. The input data elements may be transferred to the shared memory 964 from the DRAM circuit 916 via the memory bus 917.

The output data elements may be sent from the shared memory 964 to the DRAM circuit 916 via the memory bus 917. The path 966 may implement a transfer path internal to the processor 932. The transfer path 966 is generally operational to move data from the scheduler circuit 960 to the shared memory 964. The transfer path 966 may also be operational to move data from the shared memory 964 to the scheduler circuit 90. The processor 930 is shown communicating with the vector processor 932. The processor 930 may be configured as a controller for the vector processor 932. In some embodiments, the processor 930 may be configured to transfer instructions to the scheduler 960. For example, the processor 930 may provide one or more directed acyclic graphs to the scheduler 960 via the DAG memory 968. The scheduler 960 may initialize and/or configure the hardware engines 962a-962n in response to parsing the directed acyclic graphs. In some embodiments, the processor 930 may receive status information from the scheduler 960. For example, the scheduler 960 may provide a status information and/or readiness of outputs from the hardware engines 962a-962n to the processor 930 to enable the processor 930 to determine one or more next instructions to execute and/or decisions to make. In some embodiments, the processor 930 may be configured to communicate with the shared memory 964 (e.g., directly or through the scheduler 960, which receives data from the shared memory 964 via the path 966). The processor 930 may be configured to retrieve information from the shared memory 964 to make decisions. The instructions performed by the processor 930 in response to information from the vector processor 932 may be varied according to the design criteria of a particular implementation.

Although the actual implementation of the image quality parameter tuning tool in accordance with an embodiment of the invention may vary during development and test phases, the architecture of the image quality parameter tuning tool in accordance with an embodiment of the invention generally comprises two machine learning based (ML-based) cascaded models: a first artificial neural network model MODEL 1 that takes a set of images as input and generates a set of IQ parameters as output, and a second artificial neural network model MODEL 2 that evaluates the results coming from the first artificial neural network model MODEL 1 and generates a loss signal based on the comparison of a set of processed images with a set of reference images embodying desired characteristics. The second artificial neural network model MODEL 2 generally allows the first artificial neural network model MODEL 1 to be iteratively trained according to the loss signal.

In various embodiments, the two artificial neural network models, according to the disclosed architecture, may be trained at different stages. In particularly, the second artificial neural network model MODEL 2 is generally trained before the first artificial neural network model MODEL 1, since the training of the latter is based on the results from the former. Once the second artificial neural network model MODEL 2 has been trained and "freezed", the first artificial neural network model MODEL 1 may be trained by connecting the full IDSP pipeline and performing an iterative optimization based on the loss signal generated by the second artificial neural network model MODEL 2, assuming a sufficiently large dataset of images is supplied at the input. The training may, therefore, be supervised, following a classical training method. The second artificial neural network model MODEL 2 is generally trained in a semi-supervised fashion, since the model needs to learn an embedded representation of the visual characteristics with some feedbacks that may be provided by human expertise. In an example, rather than training on request, a continuous improvement approach may be followed (e.g., whenever new images, labels, historical results, etc., become available).

As mentioned above, the output of the first artificial neural network model MODEL 1 may be translated into a set of SoC-specific values, to limit the use of the image quality parameter tuning tool with competing systems. In an example, a post-processing block may intervene as an interface to the selected SoC. In an example, a proprietary version of the image quality parameter tuning tool may choose from a list of SoCs supported, and include a corresponding interface in the post-processing block. When more than one SoC is supported, a user may choose which one to address while using the image quality parameter tuning tool, in order to obtain an IQ tuning that is ready to be ported on the selected system.

The processing inside the automatic image quality parameter tuning tool generally happens by running the models and post-processing block sequentially, one after the other: first the first artificial neural network model MODEL 1, then the post-processing block based on the results from the first artificial neural network model MODEL 1, and finally the second artificial neural network model MODEL 2 (only when necessary) based on the final output. Whenever the second artificial neural network model MODEL 2 is run, the IDSP pipeline needs to be replicated (e.g., by a HW or a SW implementation). As soon as all the processing blocks are properly connected, the automatic image quality parameter tuning tool is ready to be used. In an example, application of the automatic image quality parameter tuning tool may be via a command line interface (CLI) or graphic user interface (GUI) customized for the use case.

The functions performed by the diagrams of FIGS. 1-9 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, vector processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s) The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. Execution of instructions contained in the computer product by the machine, may be executed on data stored on a storage medium and/or user input and/or in combination with a value generated using a random number generator implemented by the computer product. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. An apparatus comprising:
an interface configured to receive pixel data for one or more raw images;
a digital signal processing pipeline configured to generate processed image data by applying a set of image quality parameters on said pixel data of said one or more raw images; and
a tuning tool configured to generate (i) said set of image quality parameters based on said one or more raw images by executing a first artificial neural network model and (ii) a loss signal based on said processed image data, one or more reference images, and a loss function by executing a second artificial neural network model, wherein
   (a) said first artificial neural network model was trained using a set of said raw images, a set of said reference images, and said loss function,
   (b) one or more internal neural network parameters of said first artificial neural network are adjusted based on said one or more raw images, said one or more reference images, and said loss signal, and
   (c) tuning is repeated until said loss signal reaches a predetermined threshold.

2. The apparatus according to claim 1, wherein said image quality parameters relate to one or more of black level correction, lens distortion correction, sensor defect detection, spatial and temporal noise reduction, Bayer demosaicing, color and tone correction, brightness and saturation, contrast, sharpness, white balance, autofocus statistics, auto-exposure statistics, automatic white balance statistics, lens shading correction, color space conversion, gamma correction, dynamic range, electronic image stabilization, decompanding, anti-aliasing, chromatic aberration, digital gain, vignette compensation, and statistics extraction.

3. The apparatus according to claim 1, wherein said first artificial neural network model and said second artificial neural network model comprise convolutional neural network models.

4. The apparatus according to claim 1, further comprising a post processing circuit configured to generate a set of customized image quality parameters for a specific application or device based on said set of image quality parameters.

5. The apparatus according to claim 4, wherein said post processing circuit customizes said set of image quality parameters for use in an edge device.

6. The apparatus according to claim 4, wherein said post processing circuit allows a user to fine tune said set of image quality parameters.

7. An apparatus comprising:
an interface configured to receive pixel data for one or more raw images; and
a processor configured to process said pixel data arranged as video frames and perform computer vision operations on said video frames, said processor comprising (i) a digital signal processing pipeline configured to generate processed image data based on said pixel data of said one or more raw images and a set of image quality parameters, and (ii) a tuning tool configured to generate said set of image quality parameters based on said pixel data of said one or more raw images by executing a first artificial neural network model, wherein
   (a) said first artificial neural network model was trained using a set of said raw images, a set of reference images, and a loss function, and
   (b) said image quality parameters relate to one or more of black level correction, lens distortion correction, sensor defect detection, spatial and temporal noise reduction, Bayer demosaicing, color and tone correction, brightness and saturation, contrast, sharpness, white balance, autofocus statistics, auto-exposure statistics, automatic white balance statistics, lens shading correction, color space conversion, gamma correction, dynamic range, electronic image stabilization, decompanding, anti-aliasing, chromatic aberration, digital gain, vignette compensation, and statistics extraction.

8. The apparatus according to claim 7, wherein said tuning tool further comprises a second artificial neural network model configured to generate a loss signal based on said processed image data, said set of reference images, and said loss function.

9. The apparatus according to claim 8, wherein in a training mode of said apparatus:
said pixel data of said one or more raw images is presented to a first input of said first artificial neural network model and to a second input of a model of said digital signal processing pipeline;
said set of reference images is presented to a third input of said first artificial neural network model and a fourth input of said second artificial neural network model;
said model of said digital signal processing pipeline is configured to generate an output in response to said pixel data of said one or more raw images and said set of image quality parameters;
said second artificial neural network model is configured to generate said loss signal based on said output of said model of said digital signal processing pipeline, said set of reference images, and said loss function; and
said first artificial neural network model tunes said set of image quality parameters by adjusting one or more internal neural network parameters of said first artificial neural network model based on said one or more raw images, said set of reference images, and said loss signal.

10. The apparatus according to claim 9, wherein said training mode is ended when said loss signal reaches a predetermined threshold.

11. A method of tuning image quality parameters of a digital signal processing pipeline comprising:
receiving one or more raw images and one or more reference images;
generating a set of image quality parameters based on said one or more raw images by executing a first artificial neural network model;
generating processed image data by applying said set of image quality parameters on said one or more raw images using said digital signal processing pipeline;
generating a loss signal based on said processed image data, said one or more reference images, and a loss function by executing a second artificial neural network model;
adjusting one or more internal neural network parameters of said first artificial neural network model based on said one or more raw images, said one or more reference images, and said loss signal; and tuning is repeated until said loss signal reaches a predetermined threshold.

12. The method according to claim 11, wherein:

said one or more raw images is presented to a first input of said first artificial neural network model and to a second input of a model of said digital signal processing pipeline;

said one or more reference images is presented to a third input of said first artificial neural network model and a fourth input of said second artificial neural network model;

said model of said digital signal processing pipeline is configured to generate an output in response to said one or more raw images and said set of image quality parameters;

said second artificial neural network model is configured to generate said loss signal based on said output of said model of said digital signal processing pipeline, said one or more reference images, and said loss function; and said first artificial neural network model tunes said set of image quality parameters by adjusting said one or more internal neural network parameters of said first artificial neural network model based on said one or more raw images, said one or more reference images, and said loss signal.

13. The method according to claim 11, wherein said image quality parameters relate to one or more of black level correction, lens distortion correction, sensor defect detection, spatial and temporal noise reduction, Bayer demosaicing, color and tone correction, brightness and saturation, contrast, sharpness, white balance, autofocus statistics, autoexposure statistics, automatic white balance statistics, lens shading correction, color space conversion, gamma correction, dynamic range, electronic image stabilization, decompanding, anti-aliasing, chromatic aberration, digital gain, vignette compensation, and statistics extraction.

14. The method according to claim 11, wherein said first artificial neural network model and said second artificial neural network model comprise convolutional neural network models.

15. The method according to claim 11, further comprising:

generating a set of customized image quality parameters for a specific application or device based on said set of image quality parameters.

16. The method according to claim 15, wherein said set of image quality parameters are customized for use in an edge device.

17. The method according to claim 15, further comprising:

allowing a user to fine tune said set of image quality parameters.

18. The method according to claim 11, further comprises:

training an initial version of the first artificial neural network model using a host computer; and transferring a trained version of the first artificial neural network model to an edge device.

19. The method according to claim 18, wherein said edge device comprises a digital camera.

*   *   *   *   *